(12) United States Patent
Docker et al.

(10) Patent No.: US 10,363,939 B2
(45) Date of Patent: Jul. 30, 2019

(54) VEHICLE REFERENCE VELOCITY ESTIMATION APPARATUS AND METHOD

(71) Applicant: Jaguar Land Rover Limited, Coventry, Warwickshire (GB)

(72) Inventors: Stephen Docker, Coventry (GB); Juan A. Herrera Tugores, Coventry (GB)

(73) Assignee: Jaguar Land Rover Limited, Coventry, Warwickshire (GB)

( * ) Notice: Subject to any disclaimer, the term of this patent is extended or adjusted under 35 U.S.C. 154(b) by 0 days.

(21) Appl. No.: 15/550,322

(22) PCT Filed: Feb. 18, 2016

(86) PCT No.: PCT/EP2016/053420
§ 371 (c)(1),
(2) Date: Aug. 10, 2017

(87) PCT Pub. No.: WO2016/139067
PCT Pub. Date: Sep. 9, 2016

(65) Prior Publication Data
US 2018/0370538 A1 Dec. 27, 2018

(30) Foreign Application Priority Data
Mar. 3, 2015 (GB) .................................. 1503554.6

(51) Int. Cl.
*B60W 50/00* (2006.01)
*B60W 40/105* (2012.01)

(52) U.S. Cl.
CPC ... *B60W 40/105* (2013.01); *B60W 2050/0052* (2013.01); *B60W 2420/905* (2013.01);
(Continued)

(58) Field of Classification Search
CPC ....... B60W 40/105; B60W 2050/0052; B60W 2520/105; B60W 2520/26; B60W 2540/10; B60W 2540/12
(Continued)

(56) References Cited

U.S. PATENT DOCUMENTS 6,609,080 B1 * 8/2003 Syrjarinne ......... H03H 17/0257
702/150
6,816,804 B1 11/2004 Lee
(Continued)

FOREIGN PATENT DOCUMENTS

FR        2 871 889 A1    12/2005
WO    WO 2009/060093 A1    5/2009

OTHER PUBLICATIONS

Patents Act 1977: Combined Search and Examination Report under Sections 17 and 18(3), GB Application No. GB1503554.6, dated Aug. 12, 2015, 5 pp.
(Continued)

*Primary Examiner* — Gertrude Arthur Jeanglaude
(74) *Attorney, Agent, or Firm* — Myers Bigel, P.A.

(57) ABSTRACT

The present disclosure relates to apparatus (1) for estimating confidence in a vehicle reference velocity (V). The apparatus includes a controller having an electronic processor (21) having an electrical input for receiving at least one first vehicle operating parameter; and an electronic memory device (23) electrically coupled to the electronic processor and having instructions stored therein. The electronic processor (21) is configured to access the memory device (23) and execute the instructions stored therein such that it is operable to monitor the at least one first vehicle operating parameter; and to calculate a confidence value (F1) repre-
(Continued)

senting the confidence in the vehicle reference velocity, the confidence value (F1) being calculated in dependence on the vehicle operating parameter.

16 Claims, 18 Drawing Sheets

(52) U.S. Cl.
CPC ... *B60W 2520/105* (2013.01); *B60W 2520/26* (2013.01); *B60W 2540/10* (2013.01); *B60W 2540/12* (2013.01)

(58) Field of Classification Search
USPC .......................................................... 701/70
See application file for complete search history.

(56) References Cited

U.S. PATENT DOCUMENTS

| | | |
|---|---|---|
| 9,376,117 B1 * | 6/2016 | Parundekar ......... B60W 50/087 |
| 2004/0024565 A1 | 2/2004 | Yu et al. |
| 2011/0295457 A1 | 12/2011 | Linda et al. |
| 2015/0220848 A1 | 8/2015 | Bartholomäus |

OTHER PUBLICATIONS

International Search Report and Written Opinion of the International Searching Authority, International Application No. PCT/EP2016/053420, dated Aug. 25, 2016, 17 pp.
Examination report No. 1 for standard patent application, AU Application No. 2016227945, dated Aug. 13, 2018, 3 pp.

* cited by examiner

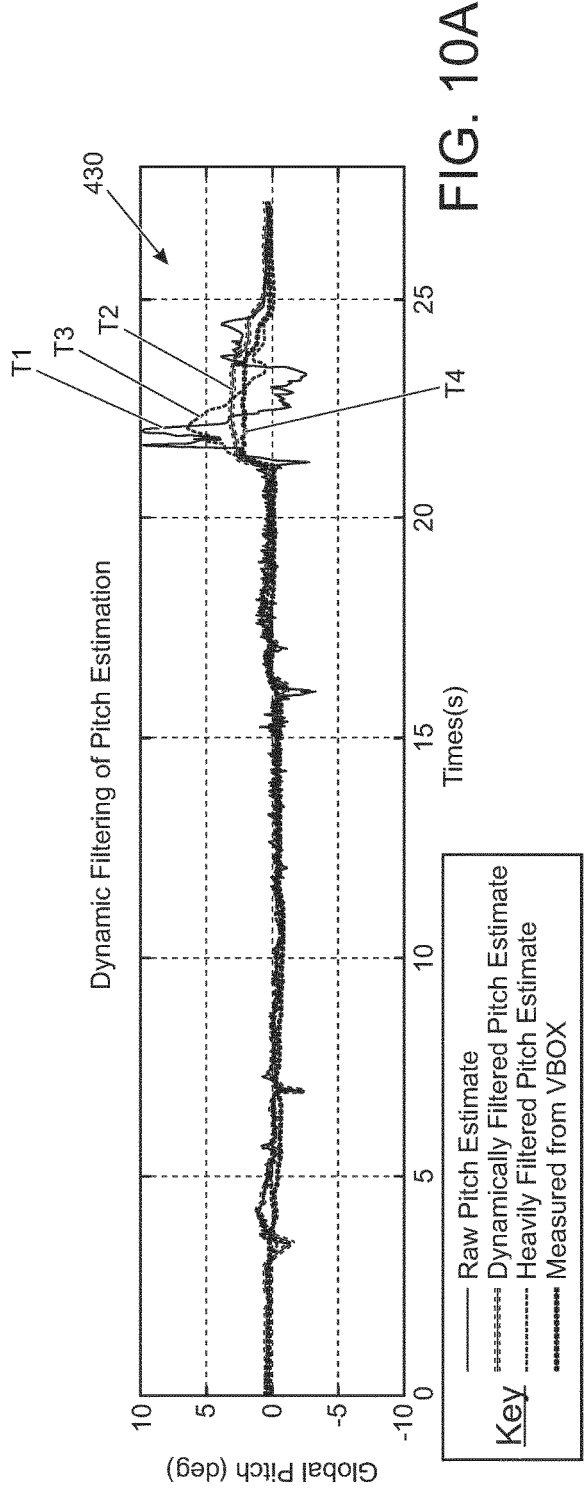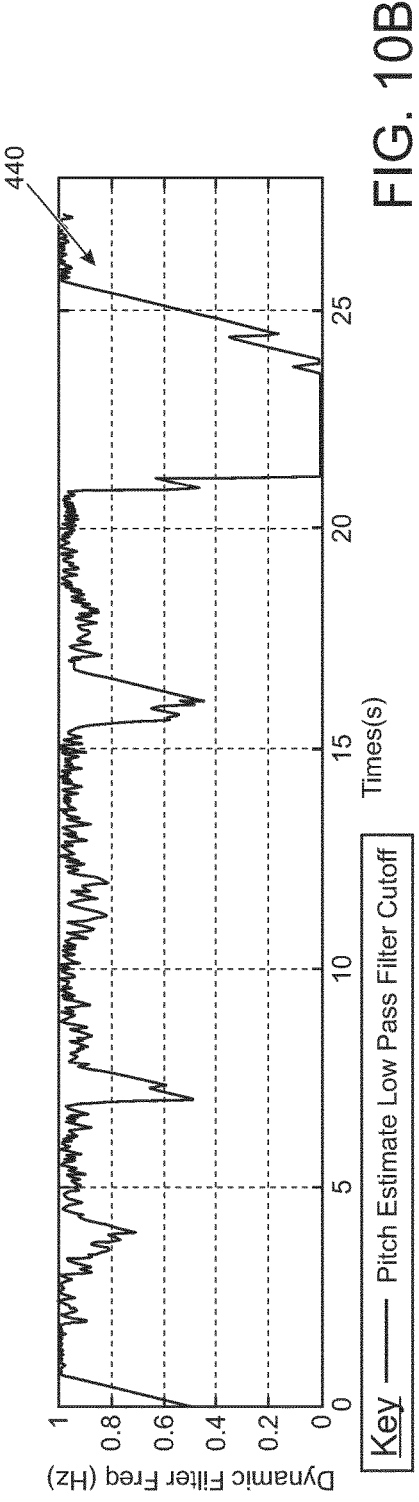

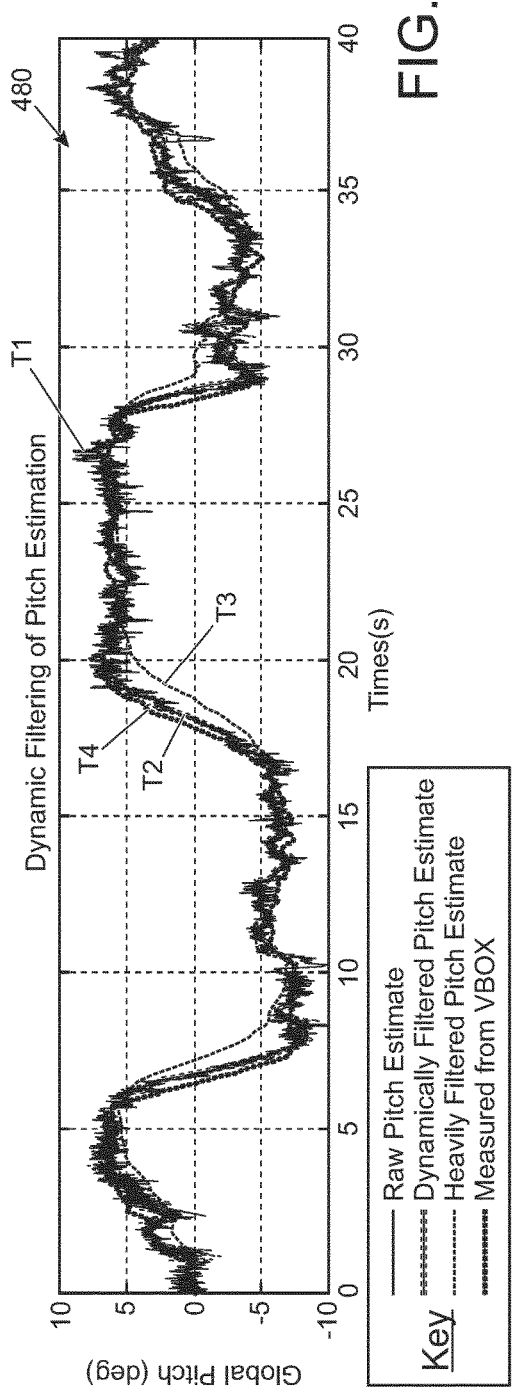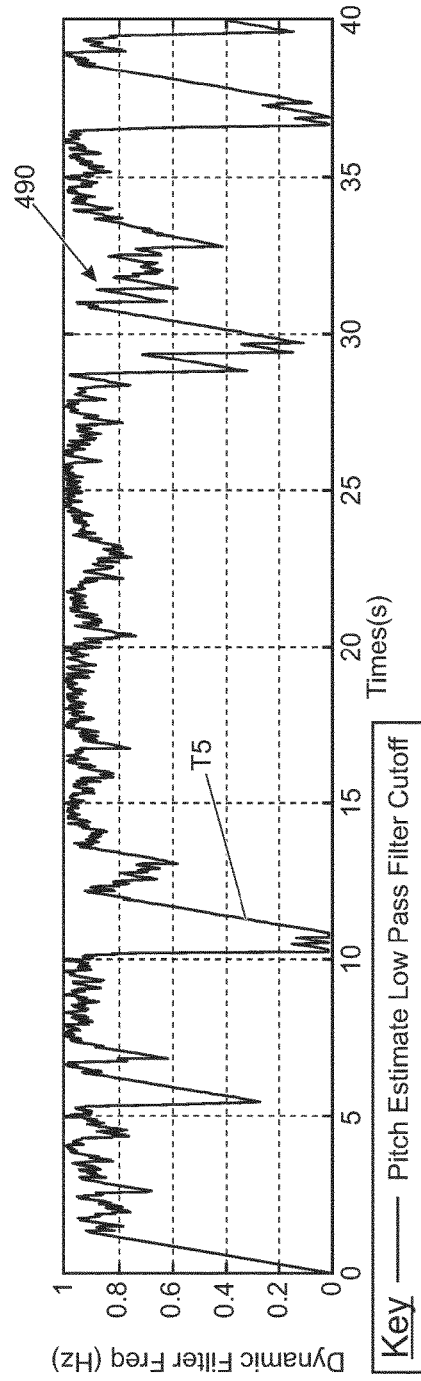
FIG. 12A
FIG. 12B

VEHICLE REFERENCE VELOCITY ESTIMATION APPARATUS AND METHOD

RELATED APPLICATIONS

This application is a 35 U.S.C. § 371 national stage application of PCT Application No. PCT/EP2016/053420, filed on Feb. 18, 2016, which claims priority from Great Britain Patent Application No. 1503554.6 filed on Mar. 3, 2015, the contents of which are incorporated herein by reference in their entireties. The above-referenced PCT International Application was published in the English language as International Publication No. WO 2016/139067 A2 on Sep. 9, 2016.

TECHNICAL FIELD

The present disclosure relates to apparatus for estimation of a vehicle reference velocity; to a vehicle incorporating vehicle reference estimation apparatus; and to a method of estimating confidence in a vehicle reference velocity.

BACKGROUND

The instantaneous state of a vehicle is defined by state parameters for vehicle pitch, vehicle roll and vehicle yaw. The vehicle state changes continuously while the vehicle is in motion, for example due to acceleration/deceleration of the vehicle and changes in the gradient of the surface on which the vehicle is travelling. The vehicle state is used by on-board vehicle dynamic control systems, for example to control vehicle stability.

In the automotive field it is known to employ an inertial monitoring unit (IMU) to continuously monitor vehicle acceleration in six degrees of freedom to monitor the vehicle state. It would be desirable to obtain more reliable data from the IMU and potentially to simplify the IMU by reducing the number of degrees of freedom in which acceleration and rates are measured. One approach is to estimate the vehicle state using measured dynamic parameters. However, global state estimations calculated from vehicle sensors are susceptible to noise and, in certain conditions, high error levels. Signal filtering can be used to lessen undershoots and overshoots in these conditions. However, for large signal-to-noise ratios heavy filtering is required which result in poor estimations in transient conditions.

It is against this backdrop that the present invention(s) has been conceived. At least in certain embodiments, the present invention seeks to overcome or ameliorate some of the shortcomings associated with known vehicle state estimation systems.

SUMMARY OF THE INVENTION

Aspects of the present invention relate to apparatus for estimation of a vehicle reference velocity; to a vehicle incorporating vehicle reference estimation apparatus; and to a method of estimating confidence in a vehicle reference velocity.

According to a further aspect of the present invention there is provided apparatus for estimating confidence in a vehicle reference velocity, the apparatus comprising:
  a controller comprising an electronic processor having an electrical input for receiving at least one first vehicle operating parameter;
  an electronic memory device electrically coupled to the electronic processor and having instructions stored therein;
  wherein the electronic processor is configured to access the memory device and execute the instructions stored therein such that it is operable to:
  monitor the at least one first vehicle operating parameter; and
  calculate a confidence value representing the confidence in the vehicle reference velocity, the confidence value being calculated in dependence on the vehicle operating parameter.

The controller can be configured to determine a rate of change of the vehicle operating parameter; and to calculate the confidence value in dependence on the determined rate of change. The controller can be configured to apply a filter to the determined rate of change; and to calculate the confidence value in dependence on the filtered rate of change.

The vehicle operating parameter can comprise a vehicle dynamics parameter. The vehicle dynamics parameter can be longitudinal vehicle acceleration.

The vehicle operating parameter can comprise a vehicle control input. The vehicle control input can be a throttle pedal position or a brake pedal position.

The vehicle operating parameter can comprise a wheel slip measurement of at least one wheel of the vehicle. The wheel slip measurement can be compared to a look-up table to generate the confidence value.

The controller can be configured to generate a plurality of said confidence values, each confidence value being generated in dependence on a different operating parameter; and wherein the controller is configured to select the confidence value representing the lowest confidence in the vehicle reference velocity.

According to a further aspect of the present invention there is provided apparatus for estimating confidence in a vehicle reference velocity, the apparatus comprising:
  a controller comprising an electronic processor having an electrical input for receiving a first vehicle operating parameter and a second vehicle operating parameter;
  an electronic memory device electrically coupled to the electronic processor and having instructions stored therein;
  wherein the electronic processor is configured to:
    calculate a first confidence value in dependence on the first vehicle operating parameter;
    calculate a second confidence value in dependence on the second vehicle operating parameter; and
    set a vehicle reference confidence value in dependence on the one of said calculated first and second confidence values that represents the lower confidence in the vehicle reference velocity.

The first vehicle operating parameter and/or said second vehicle operating parameter can comprise a vehicle dynamics parameter.

The first vehicle operating parameter and/or the second vehicle operating parameter can comprise a vehicle control input. The vehicle control input can comprise a throttle pedal position signal or a brake pressure pedal signal.

The controller can be configured to normalise the first and second confidence values. The first and second confidence values can be normalised by applying a gain, for example.

The first confidence value can be proportional (either directly or inversely) to the first vehicle operating parameter;

and/or the second confidence value can be proportional (either directly or inversely) to the second vehicle operating parameter.

The controller can be configured to determine a first rate of change of the first vehicle operating parameter and the first confidence value can be calculated in dependence on the determined first rate of change. The controller can be configured to determine a second rate of change of the second vehicle operating parameter and the second confidence value can be calculated in dependence on the determined second rate of change.

The controller can be configured to set an operating frequency of a signal filter in dependence on the determined confidence value. The signal filter can be a variable signal filter. The signal filter can be a low-pass signal filter.

The controller can be configured to apply the signal filter to at least a first vehicle reference velocity. The first vehicle reference velocity can be derived from a first source. The vehicle reference velocity can be determined in dependence on a measured wheel speed of at least one wheel of a vehicle.

The controller can be configured to apply the signal filter to a second vehicle reference velocity. The second vehicle reference velocity can be derived from a second source. The second source can comprise a measured longitudinal acceleration signal.

The electronic processor can be configured to output the confidence value to a vehicle dynamics controller.

According to a further aspect of the present invention there is provided a vehicle comprising apparatus as described herein.

According to a still further aspect of the present invention there is provided a method of determining confidence in a vehicle reference velocity, the method comprising:
  monitoring at least one first vehicle operating parameter; and
  calculating a confidence value representing the confidence in the vehicle reference velocity, the confidence value being calculated in dependence on the vehicle operating parameter.

The method can comprise determining a rate of change of the vehicle operating parameter; and calculating the confidence value in dependence on the determined rate of change.

The method can comprise applying a filter to the determined rate of change; and calculating the confidence value in dependence on the filtered rate of change.

The vehicle operating parameter can comprise a vehicle dynamics parameter. The vehicle dynamics parameter can be longitudinal vehicle acceleration.

The vehicle operating parameter can comprises a vehicle control input. The vehicle control input can be a throttle pedal position or a brake pedal position.

The vehicle operating parameter can comprise a wheel slip measurement of at least one wheel. The wheel slip measurement can be compared to a look-up table to generate the confidence value.

The method can comprise generating a plurality of said confidence values, each confidence value being generated in dependence on a different operating parameter; and selecting the confidence value representing the lowest confidence in the vehicle reference velocity.

According to a yet further aspect of the present invention there is provided a method of estimating confidence in a vehicle reference velocity, the method comprising:
  calculating a first confidence value in dependence on a first vehicle operating parameter;
  calculating a second confidence value in dependence on a second vehicle operating parameter; and
  setting a vehicle reference confidence value in dependence on the one of said first and second confidence values representing the lower confidence in the vehicle reference velocity.

The first vehicle operating parameter and/or said second vehicle operating parameter can comprise a vehicle dynamics parameter.

The first vehicle operating parameter and/or said second vehicle operating parameter can comprise a vehicle control input.

The controller can be configured to normalise the first confidence value and/or the second confidence values. A gain can be applied to normalise the first confidence value and/or the second confidence value.

The first confidence value can be proportional (either directly or inversely) to the first vehicle operating parameter. The second confidence value can be proportional (either directly or inversely) to the second vehicle operating parameter.

The method can comprise determining a first rate of change of the first vehicle operating parameter and calculating the first confidence value in dependence on the determined first rate of change. The method can comprise determining a second rate of change of the second vehicle operating parameter and calculating the second confidence value in dependence on the determined second rate of change.

The controller can be configured to set an operating frequency of a signal filter in dependence on the determined confidence value. The method can comprise applying the signal filter to at least a first vehicle reference velocity.

The vehicle reference velocity can be determined in dependence on a measured wheel speed of at least one wheel of a vehicle.

The method can comprise applying the signal filter to a second vehicle reference velocity. The second vehicle reference velocity can be derived from a second source.

The method can comprise outputting the confidence value to a vehicle dynamics controller.

Any controller or controllers described herein may suitably comprise a control unit or computational device having one or more electronic processors. Thus the system may comprise a single control unit or electronic controller or alternatively different functions of the controller may be embodied in, or hosted in, different control units or controllers. As used herein the term "controller" or "control unit" will be understood to include both a single control unit or controller and a plurality of control units or controllers collectively operating to provide any stated control functionality. To configure a controller, a suitable set of instructions may be provided which, when executed, cause said control unit or computational device to implement the control techniques specified herein. The set of instructions may suitably be embedded in said one or more electronic processors. Alternatively, the set of instructions may be provided as software saved on one or more memory associated with said controller to be executed on said computational device. A first controller may be implemented in software run on one or more processors. One or more other controllers may be implemented in software run on one or more processors, optionally the same one or more processors as the first controller. Other suitable arrangements may also be used.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the present invention will now be described, by way of example only, with reference to the accompanying drawings, in which:

FIGS. 10A and 10B show the dynamic filtering of pitch estimation based on the measured vehicle parameters shown in FIGS. 9A-C;

FIGS. 12A and 12B show the dynamic filtering of pitch estimation based on the measured vehicle parameters shown in FIGS. 11A-C

DETAILED DESCRIPTION

A vehicle state estimation apparatus 1 in the form of a global pitch angle estimator will now be described with reference to the accompanying Figures.

Figure 1:
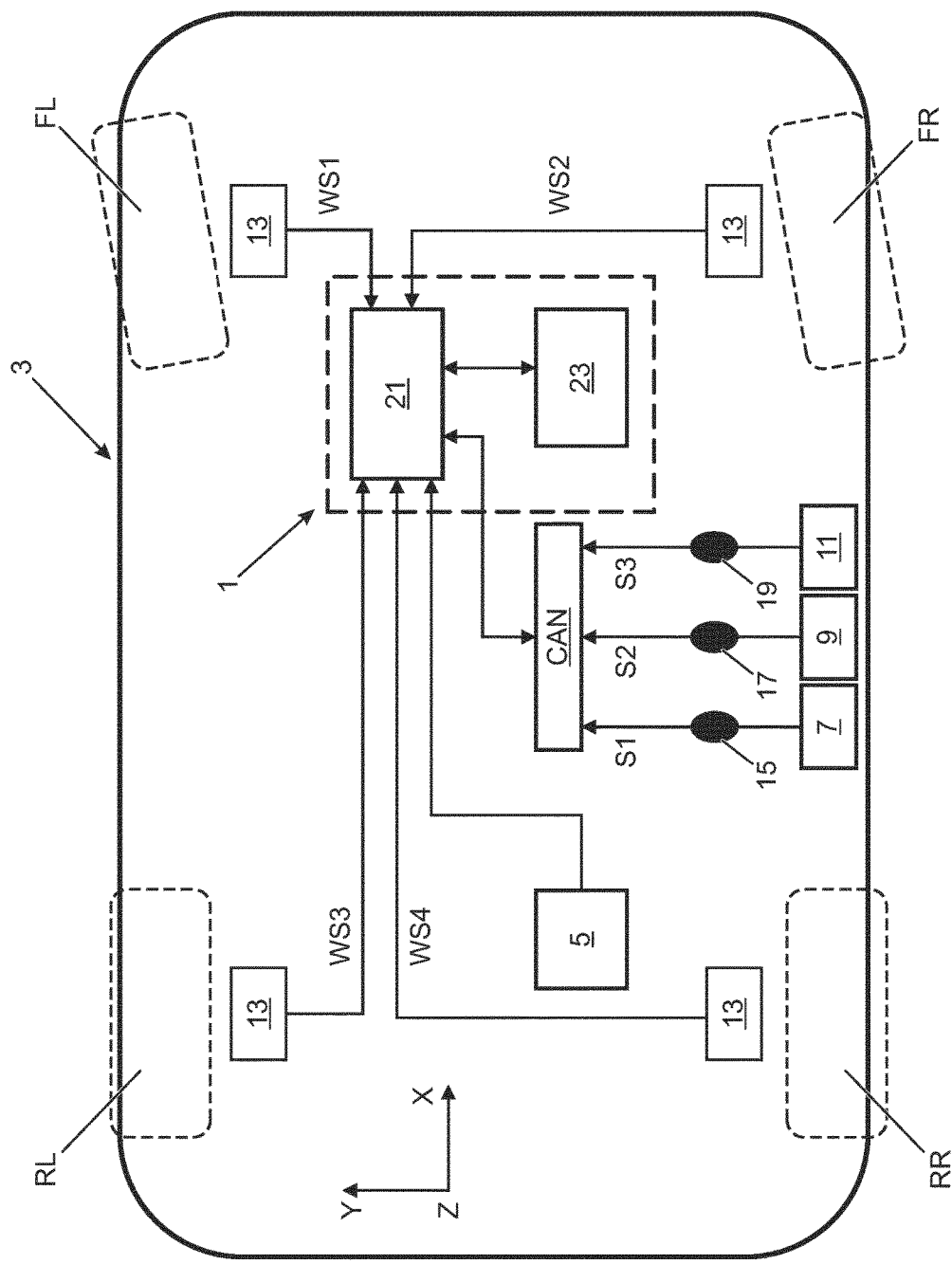
FIG. 1 shows a schematic overview of a vehicle incorporating a vehicle state estimation apparatus in accordance with an embodiment of the present invention.

A schematic representation of a vehicle 3 incorporating the vehicle state estimation apparatus 1 is shown in FIG. 1. The vehicle 3 in the present embodiment is an automotive vehicle having four wheels FL, FR, RL, RR, an inertial measurement unit (IMU) 5, a throttle pedal 7, a brake pedal 9 and a steering wheel 11. A rotational speed sensor 13 is provided to measure the rotational speed of each wheel FL, FR, RL, RR to generate wheel speed signals WS1-4. The wheel speed signals WS1-4 are used to determine a reference velocity V of the vehicle 3 and, as described herein, to detect wheel spin. A first position sensor 15 is provided to measure the position of the throttle pedal 7 and to output a throttle pedal position signal S1. A pressure sensor 17 is provided to measure the hydraulic pressure in the brake system and to output a brake pressure signal S2. A steering wheel angle sensor 19 is provided to measure the steering angle θ of the steering wheel 11 and to output a steering angle signal S3.

Figure 2:
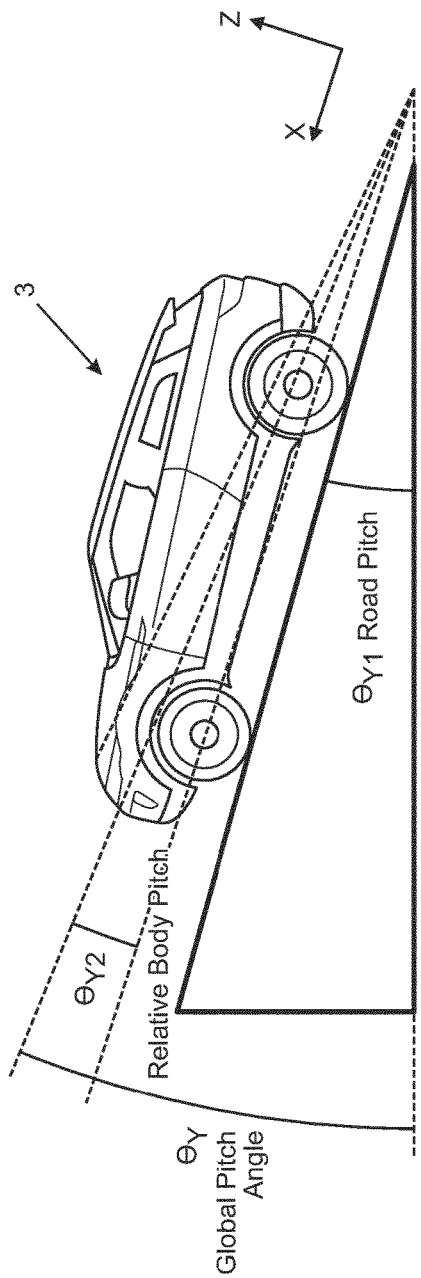
FIG. 2 illustrates the pitch angles of a vehicle travelling on an inclined surface.
Figure 3:
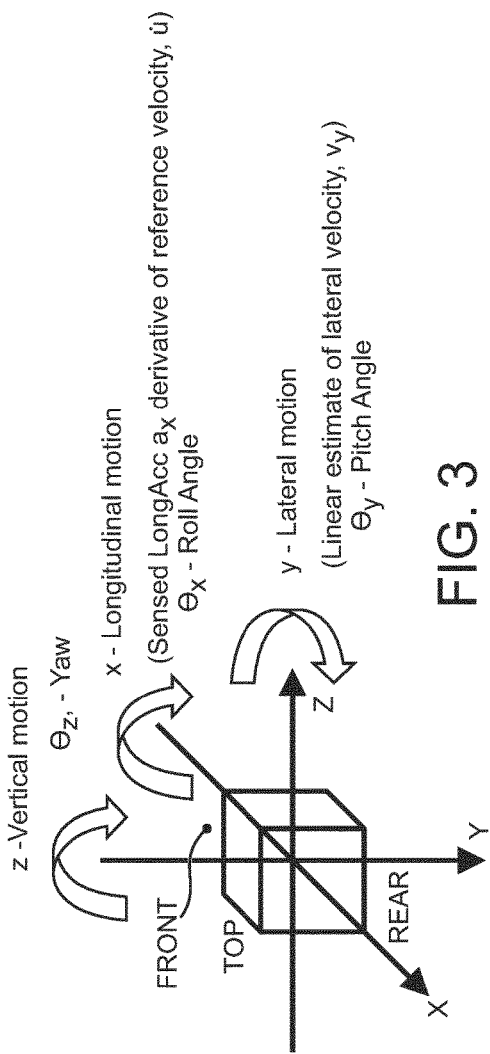
FIG. 3 represents the measurements taken by an inertial measurement unit provided on a vehicle.

The vehicle state is defined with reference to a longitudinal axis X, a transverse axis Y and a vertical axis Z of the vehicle 3. The reference speed V of the vehicle 3 is measured along the longitudinal axis X. As shown in FIG. 2, rotation about the longitudinal axis X is referred to as vehicle roll; rotation about the transverse axis Y is referred to as vehicle pitch; and rotation about the vertical axis Z is referred as vehicle yaw. The attitude of the vehicle 3 is defined by a roll angle $\theta_X$ (angular rotation about the longitudinal axis X), a pitch angle $\theta_y$ (angular rotation about the transverse axis Y) and a yaw angle $\theta_Z$ (angular rotation about the vertical axis Z). The IMU 5 comprises accelerometers arranged to measure acceleration in six degrees of freedom, as illustrated in FIG. 3. The IMU 5 comprises an accelerometer adapted to measure the longitudinal acceleration $A_X$ of the vehicle 3 (i.e. acceleration along the longitudinal axis X) and to output a longitudinal acceleration signal. Suitable IMUs are known in the art and described, for example IMU BM1055 produced by Bosch-Sensortec which measures six degrees of freedom.

The pitch angle $\theta_y$ of the vehicle 3 in relation to a horizontal axis and is referred to as the global pitch angle $\theta_y$. The global pitch angle $\theta_y$ comprises a road pitch angle $\theta_{Y1}$ and a relative body pitch angle $\theta_{Y2}$. The road pitch angle $\theta_{Y1}$ corresponds to an incline angle of the road (or other surface on which the vehicle 3 is situated); and the relative body pitch angle $\theta_{Y2}$ corresponds to the pitch of the vehicle body relative to the road pitch angle $\theta_{Y1}$. The relative body pitch angle $\theta_{Y2}$ changes due to acceleration/deceleration forces and/or vehicle loads. The global pitch angle $\theta_y$ is used to estimate lateral kinematics and velocities, for example to determine a side slip angle of the vehicle 3.

As shown in FIG. 1, the vehicle state estimation apparatus 1 comprises a processor 21 coupled to system memory 23. The processor 21 is configured to perform a set of computational instructions held in the system memory 23. The processor 21 is in communication with a vehicle communication network, such as a controller area network (CAN) bus or FlexRay, to receive the wheel speed signals WS1-4, the longitudinal acceleration signal, the throttle pedal position signal S1, the brake pressure signal S2 and the steering angle signal S3.

The longitudinal acceleration signal output by the IMU 5 contains a component due to gravity and, under yaw conditions, a component from centripetal acceleration. These components may contaminate the longitudinal acceleration signal and result in errors. In order to determine the global pitch angle θ$_y$, the vehicle pure longitudinal acceleration is determined from the reference velocity V. The reference velocity V is calculated from the wheel speed signals WS1-4, either by the processor 21 or a separate processor. In the present embodiment, the reference velocity V is calculated as the mean of the rotational speeds of the wheels FL, FR, RL, RR, however any other known methods of obtaining a reference velocity, for example the speed of the second slowest moving wheel or the average speed of two un-driven wheels of the vehicle, may of course be used. As will be understood the term reference velocity is a term used in the art to describe a speed of a vehicle derived from the speeds of two or more individual wheels speeds. Using the assumption that the vehicle 3 is in a condition of linear side slip, the estimated lateral velocity at the rear of the vehicle 3 can be translated to the position of the IMU 5. This assumption allows the global pitch angle θ$_y$ to be calculated using the following global pitch estimation algorithm:

$$\theta_y = \sin^{-1}\left(\frac{a_x - \dot{u} + \omega_z \cdot v_y}{g}\right)$$

Where: θ$_y$ is the global pitch angle;
a$_x$ is the measured longitudinal acceleration;
u̇ is the derivative of the reference velocity V;
ω$_z$ is the angular velocity about the Z axis;
v$_y$ is the estimated lateral velocity; and
g is the acceleration due to gravity.

Figure 4:
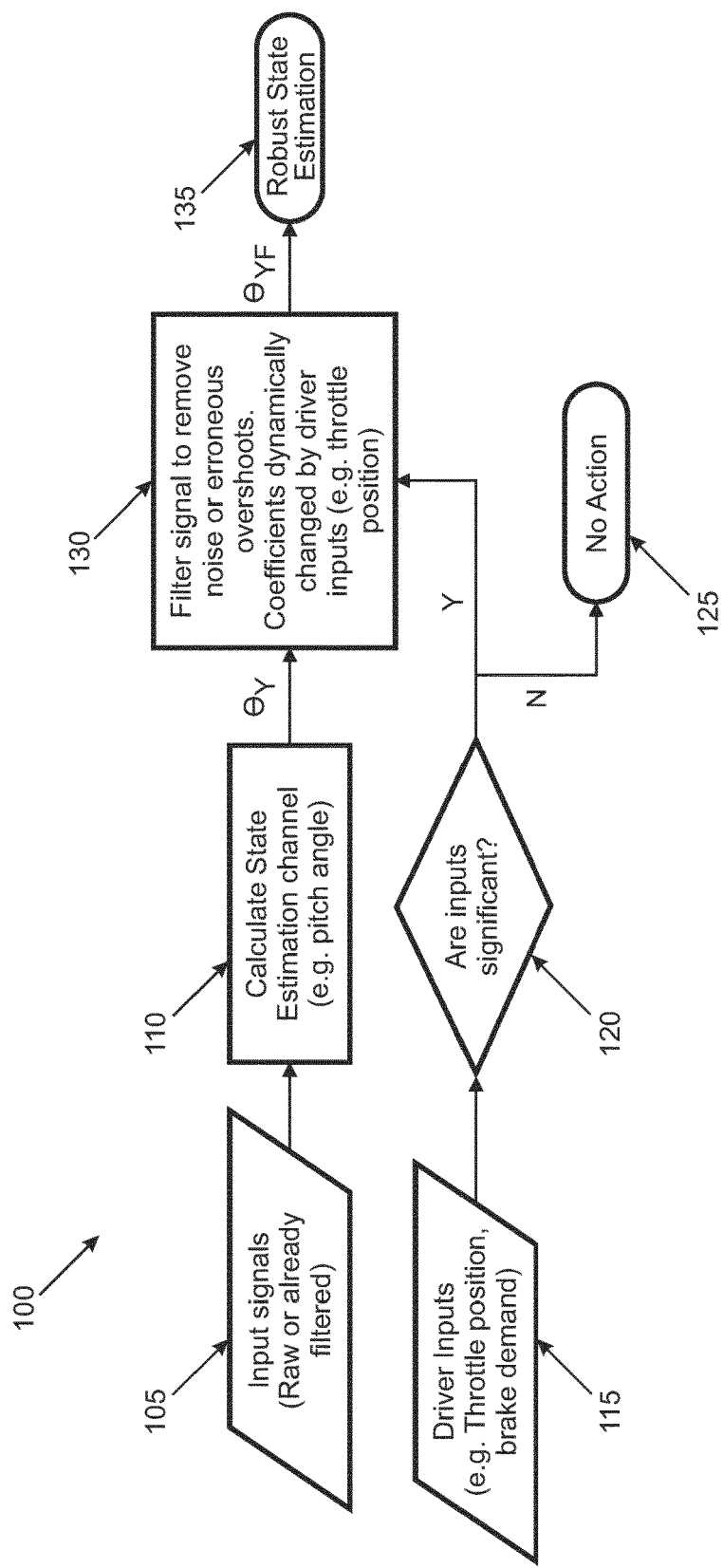
FIG. 4 shows a flow diagram representing the operation of the global pitch angle estimator shown in FIG. 3.

An overview of the operation of the vehicle state estimation apparatus 1 is provided in a first flow diagram 100 shown in FIG. 4. The vehicle state estimation apparatus 1 receives the measured longitudinal acceleration A$_X$ and the reference velocity V (STEP 105). A first estimation of the global pitch angle θ$_y$ is calculated (STEP 110) using the global pitch estimation algorithm. A variable frequency filter is applied to the calculated (raw) global pitch angle θ$_y$ to remove noise or erroneous overshoots. An operating frequency of the variable frequency filter is determined based on a confidence value providing an indication of the confidence in the calculated global pitch angle θ$_y$. A plurality of confidence values are calculated in dependence on at least one vehicle dynamic parameter and/or at least one control input which one of the confidence values is selected to determine a filter coefficient to control an operating frequency of the variable frequency filter. In the present embodiment, the at least one vehicle dynamic parameter comprises wheel spin which influences the accuracy of the determined reference velocity V; and the at least one control input received by the vehicle state estimation apparatus 1 comprises the throttle pedal position signal S1 and/or the brake pressure signal S2 (STEP 115). A check is performed to determine if the control input(s) is significant (STEP 120), for example to determine if a detected rate of change of the control input is greater than a defined threshold. If the vehicle state estimation apparatus 1 determines that the control inputs are not significant, no action is required (STEP 125). If the vehicle state estimation apparatus 1 determines that the control inputs are significant, the confidence value is modified dynamically. The determined confidence value sets the operating frequency of the variable frequency filter which is then used to filter the calculated global pitch angle θ$_y$ (STEP 130). The filtered global pitch signal is output as a filtered global pitch angle estimate θ$_{yF}$ (STEP 135) which can be used, for example, to implement vehicle dynamics control.

Figure 5:
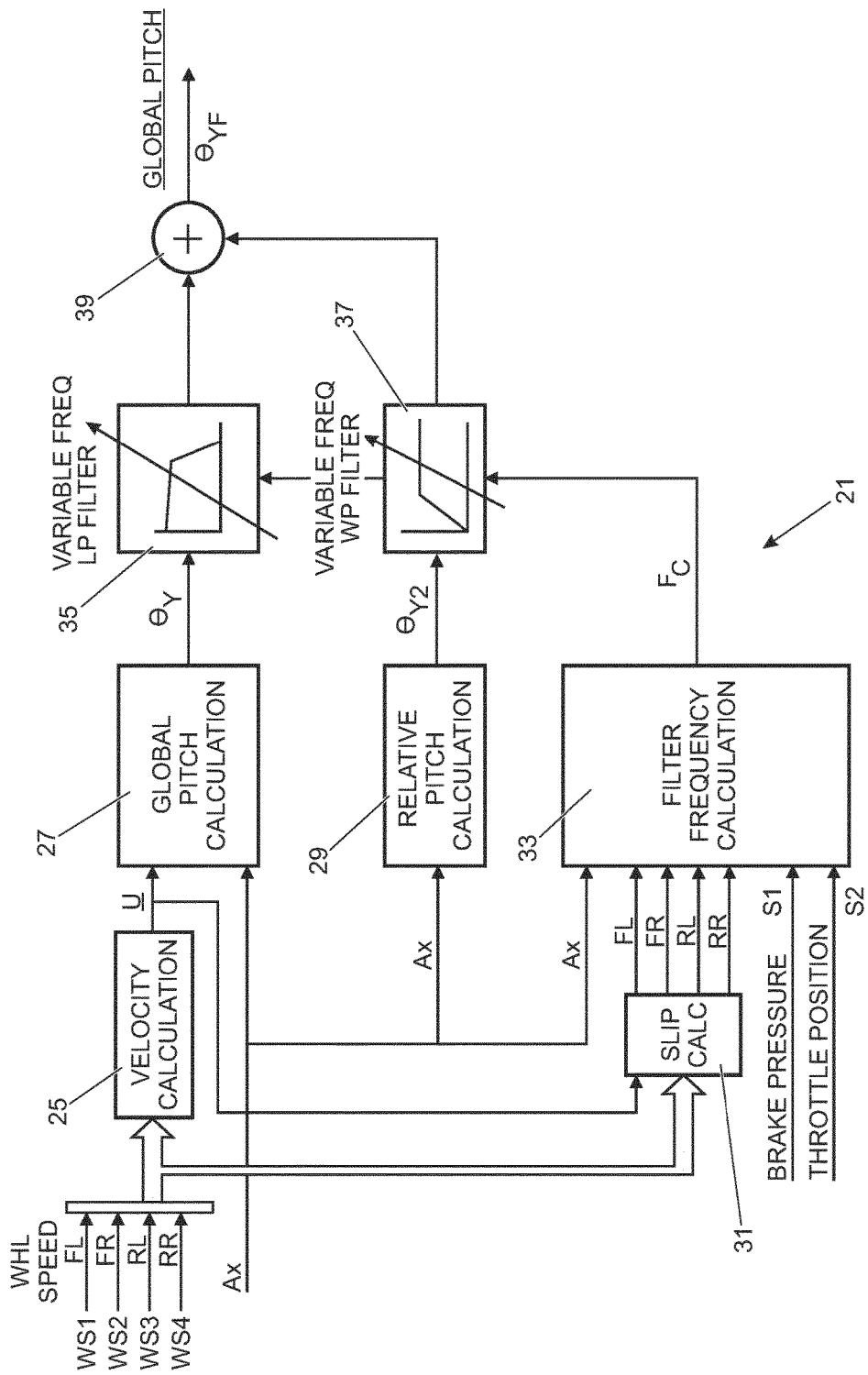
FIG. 5 shows a schematic representation of the processor functions for the vehicle state estimation apparatus.
Figure 6:
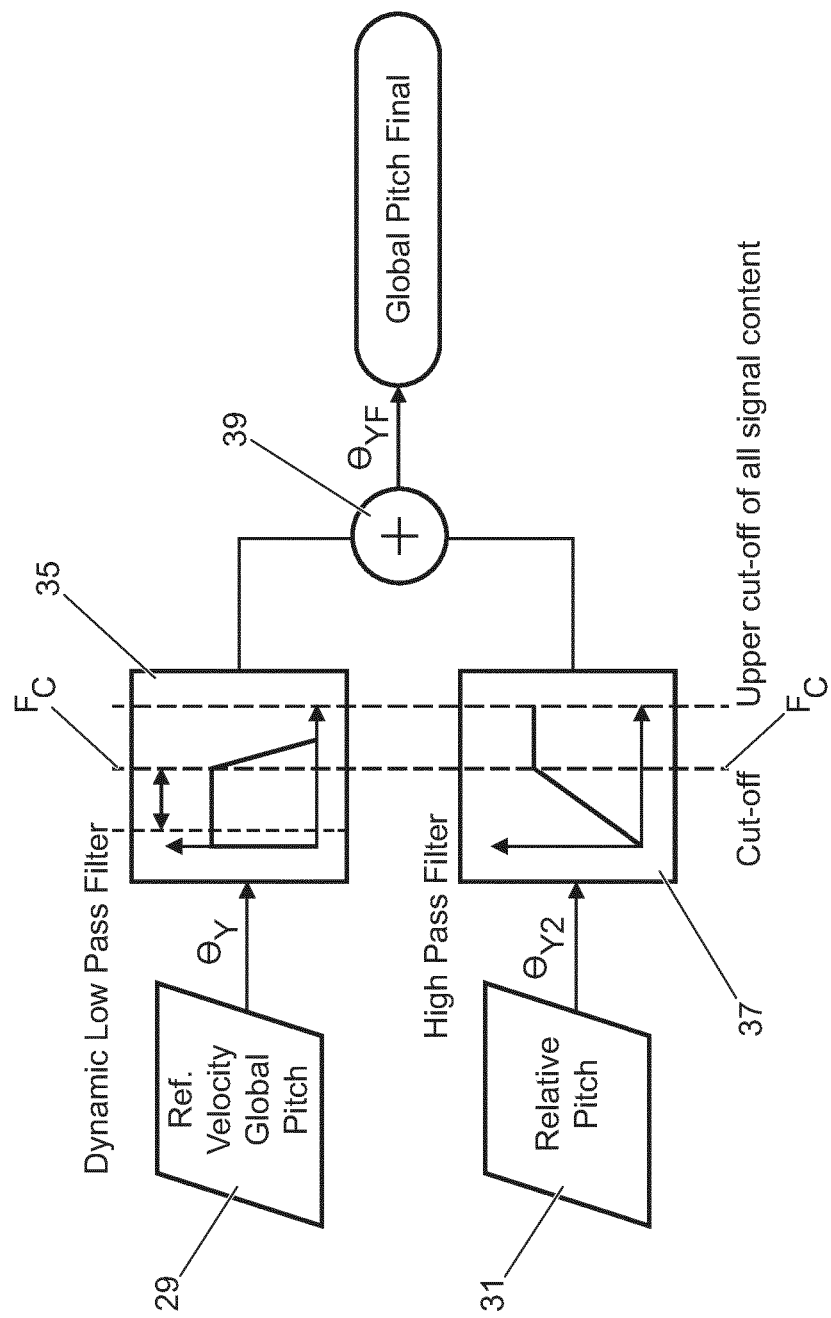
FIG. 6 illustrates the application of a variable low-pass signal filter and a variable high-pass signal filter to the unfiltered global pitch angle and the relative body pitch angle.
Figure 7:
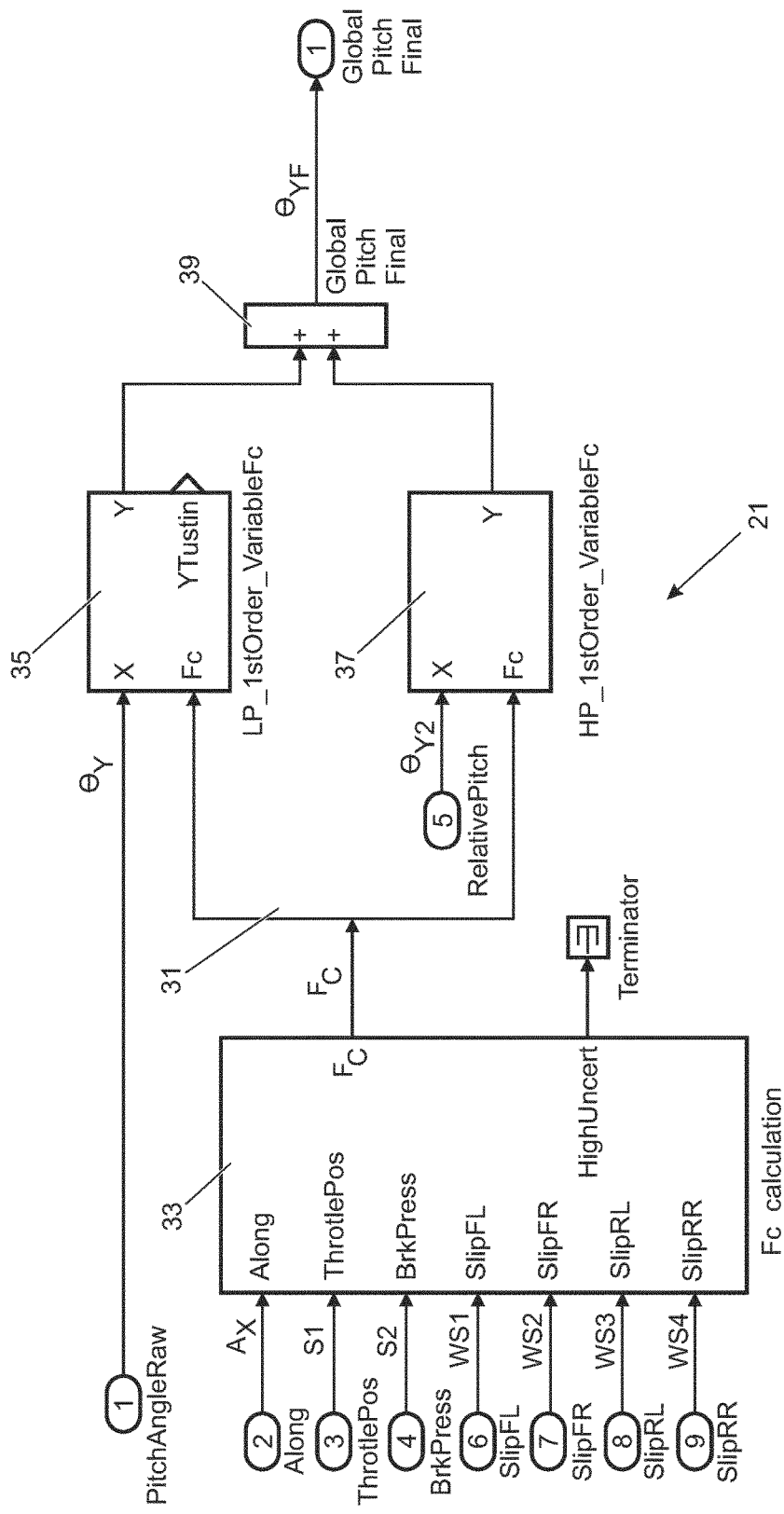
FIG. 7 illustrates the generation of a filter coefficient to control the variable low-pass signal filter and the variable high-pass signal filter shown in FIG. 6.

The processor 21 is represented schematically in FIGS. 5, 6 and 7. The processor 21 is configured to implement a reference velocity calculator 25, a global pitch calculator 27, a relative body pitch calculator 29, a slip calculator 31 and a confidence estimator 33. The processor 21 also implements a variable frequency low-pass signal filter 35 and a variable frequency high-pass signal filter 37. The cut-off frequency of the variable frequency low-pass signal filter 35 can be set at between zero (0) and one (1) Hertz inclusive. The cut-off frequency of the variable frequency high-pass signal filter 37 can be set between zero (0) and one (1) Hertz, inclusive. The cut-off frequency of the variable frequency low-pass signal filter 35 is set at the same value as the cut-off frequency of the variable frequency high-pass signal filter 37. It will be understood that the filter range could be changed for different applications. For example, a filter range of 0-0.7 Hz would be workable.

The reference velocity calculator 25 receives the wheel speed signals WS1-4 from the rotational speed sensors 13 associated with each wheel FL, FR, RL, RR. The reference velocity V is calculated using the wheel speed signals WS1-4 to determine the mean rotational speed WS of the wheels FL, FR, RL, RR. The reference velocity V is output to the global pitch calculator 27 and to the slip calculator 31. As outlined above, the global pitch calculator 27 uses the reference velocity V and the measured longitudinal acceleration A$_X$ to calculate the global pitch angle θ$_y$. The global pitch angle θ$_y$ is output to the variable frequency low-pass signal filter 35. The relative body pitch calculator 29 uses the measured longitudinal acceleration A$_X$ to determine the relative body pitch angle θ$_{y2}$. In particular, the relative body pitch calculator 29 cross-references the measured longitudinal acceleration A$_X$ with empirically derived data stored in the system memory 23 to determine the relative body pitch angle θ$_{y2}$ commensurate with a measured longitudinal acceleration A$_X$. For example, a stored value of pitch gradient can be referenced and multiplied by the measured longitudinal acceleration A$_X$. The relative body pitch angle θ$_{y2}$ is output to the variable frequency high-pass signal filter 37.

The slip calculator 31 compares the wheel speed signals WS1-4 to the reference velocity V to determine the wheel slip for each wheel FL, FR, RL, RR. The confidence estimator 33 receives the calculated wheel slip for each wheel FL, FR, RL, RR, along with the measured longitudinal acceleration A$_X$, the brake pressure signal S2 and the throttle pedal position signal S1. The confidence estimator 33 calculates a confidence value F in the calculated global pitch angle θ$_y$. In the present embodiment, the confidence value F lies in the range zero (0) to one (1), with zero (0) representing the maximum confidence and one (1) representing the minimum confidence. The confidence value F is used to determine a filter coefficient F$_C$ to set the cut-off frequency of the variable frequency low-pass signal filter 35 and the cut-off frequency of the variable frequency high-pass signal filter 37. The cut-off frequency of the variable frequency low-pass signal filter 35 is set at the same value as the cut-off frequency of the variable frequency high-pass signal filter 37 to provide complementary signal filtering. In the present embodiment, the filter coefficient F$_C$ is calculated by subtracting the determined confidence value F from one (1). Thus, the smaller the confidence value F (representing a higher confidence in the calculated global pitch angle θ$_y$), the higher the cut-off frequency of the variable frequency low-pass signal filter 35 and the variable frequency high-pass signal filter 37. Conversely, the larger the confidence value F (representing a lower confidence in the calculated global pitch angle $\theta_y$), the lower the cut-off frequency of the variable frequency low-pass signal filter 35 and the variable frequency high-pass signal filter 37. As illustrated in FIG. 6, the global pitch angle $\theta_y$ is filtered by the variable frequency low-pass signal filter 35; and the relative body pitch angle $\theta_{y2}$ is filtered by the variable frequency high-pass signal filter 37. The processor 21 sums the filtered signals to generate the filtered global pitch angle estimate $\theta_{YF}$.

Figure 8:
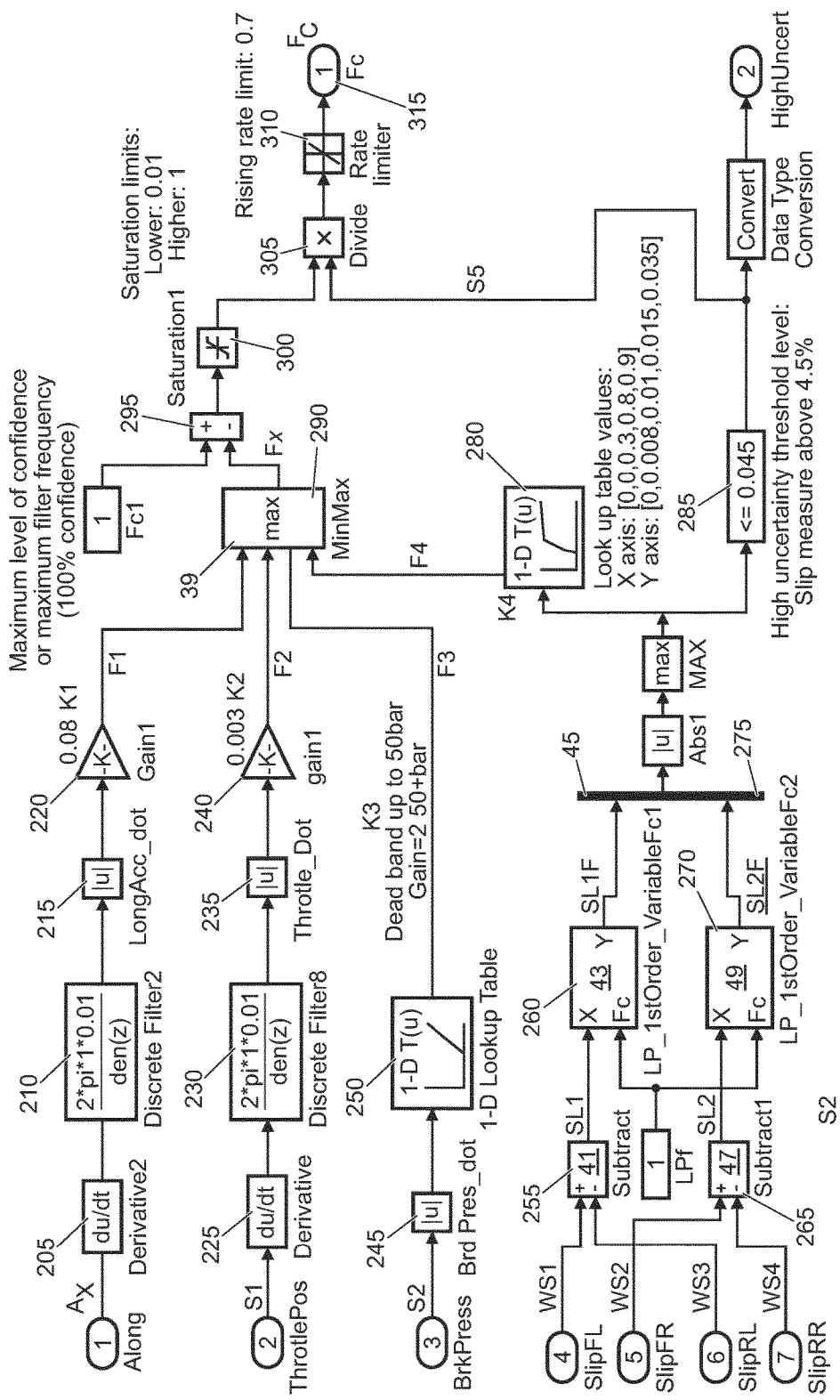
FIG. 8 shows a block diagram representing the operation of the processor to generate confidence values to determine the filter coefficient.

The operation of the confidence estimator 33 will now be described in more detail with reference to a block diagram 200 shown in FIG. 8.

The confidence estimator 33 receives the measured longitudinal acceleration $A_X$ and determines a rate of change of the longitudinal acceleration $A_X$ with respect to time (STEP 205), which can be referred to as jerk. A first discrete high frequency filter (for example 3-5 Hz) is applied to the rate of change signal (STEP 210) and the magnitude of the resultant signal determined (STEP 215). A first gain K1 is then applied (STEP 220) to generate a first confidence value F1 which provides an indication of a confidence in the calculated global pitch angle $\theta_y$ based on the current rate of change in the longitudinal acceleration $A_X$ of the vehicle 3. In the present embodiment, the first gain K1 is set at 0.08, but this value can be calibrated to suit particular applications. The first confidence value F1 is output to a comparator 39.

The confidence estimator 33 receives the throttle pedal position signal S1 and determines a rate of change of the throttle pedal position with respect to time (STEP 225). A second discrete high frequency filter (for example 5 Hz) is applied to the rate of change signal (STEP 230) and the magnitude of the resultant signal determined (STEP 235). A second gain K2 is applied (STEP 240) to generate a second confidence value F1 which provides an indication of a confidence in the calculated global pitch angle $\theta_y$ based on the current rate of change of the throttle pedal position. In the present embodiment, the second gain K1 is set at 0.003, but this value can be calibrated to suit particular applications. The second confidence value F2 is output to the comparator 39.

The confidence estimator 33 receives the brake pressure signal S2 and determines the magnitude of the brake pressure (STEP 245). The brake pressure is compared to a look-up table (STEP 250) to generate a third confidence value F3 which provides an indication of a confidence in the calculated global pitch angle $\theta_y$ based on the current the brake pressure. The look-up table defines a dead band for brake pressures below 50 bar. If the brake pressure is less than 50 bar, a value of zero (0) is returned as a third confidence value F3. If the brake pressure is greater than 50 bar, a third gain K3 is applied to generate the third candidate filter coefficient F3. In the present embodiment, the third gain K3 is interpolated linearly between 0 and 1 in dependence on brake pressure measurement between 50 bar and 100 bar. By way of example, the third gain K3 is set as 1 when the brake pressure is greater than or equal to 100 bar, 0.5 when the brake pressure is 75 bar; and zero when the brake pressure is less than or equal to 50 bar. The third confidence value F3 provides an indication of a confidence in the calculated global pitch angle $\theta_y$ based on the current brake pressure. It will be understood that the third gain K3 can be calibrated to suit particular applications.

The slip calculator 31 receives the wheel speed signals WS1-4 from each speed sensor to determine the difference in the rotational speed of the front and rear wheels on each side of the vehicle. A first slip calculator 41 receives the wheel speed signals WS1, S3 for the wheels FL, RL on the left hand side of the vehicle 3 and determines the difference in their respective rotational speeds (STEP 255). The first slip calculator 41 subtracts the rotational speed of the rear left wheel RL from the rotational speed of the front left wheel FL and outputs a first slip value SL1. The first slip value SL1 is output to a first low-pass signal filter 43 which filters the first slip value SL1 (STEP 260) and the first filtered slip value SL1F is output to a multiplexer 45. The first filtered slip value SL1F is expressed as a percentage (%).

A second slip calculator 47 receives the wheel speed signals S2, S4 for the wheels FR, RR on the right hand side of the vehicle 3 and determines the difference in their respective rotational speeds (STEP 265). The second slip calculator 47 subtracts the rotational speed of the rear right wheel RL from the rotational speed of the front right wheel FR and outputs a second slip value SL2. The second slip value SL2 is output to a second low-pass signal filter 49 which filters the second slip value SL2 (STEP 270) and the second filtered slip value SL2F is output to the multiplexer 45. The second filtered slip value SL2F is expressed as a percentage (%).

The multiplexer 45 outputs an array comprising the first and second filtered slip values SL1F, SL2F (STEP 275). A fourth gain K4 is applied to the array (STEP 280) to generate a fourth confidence value F4. The fourth gain K4 is a non-linear relationship defined with reference to a graph in which the fourth gain K4 is defined along an X-axis (0, 0, 0.3. 0.8, 0.9) and the wheel slip is defined along a Y-axis (0, 0.008, 0.01, 0.015, 0.035). The fourth confidence value F4 provides an indication of a confidence in the calculated global pitch angle $\theta_y$ based on the detected wheel slip. By way of example, a detected wheel slip of 1% results in the fourth confidence value F4 being output as 0.3. The maximum detected wheel slip SL1F, SL2F is compared to a predetermined slip threshold (STEP 285), the slip threshold being set as 4.5% in the present embodiment. An uncertainty signal S5 is output to indicate a confidence rating in the calculated global pitch angle $\theta_y$. The uncertainty signal S5 is set to zero (0) if the detected wheel slip exceeds the slip threshold; and the uncertainty signal is set to one (1) if the detected wheel slip is less than the slip threshold.

The first, second, third and fourth gains K1-4 are operative to normalize the first, second, third and fourth confidence values F1-4 to one (1), such that zero (0) represents the lowest confidence and one (1) represents the highest confidence. The comparator 39 selects the highest of the first, second, third and fourth confidence values F1-4 which represents the lowest confidence in the calculated global pitch angle $\theta_y$ (STEP 290). The processor 21 subtracts the selected confidence value Fx from one (1) (STEP 295) and applies upper and lower saturation limits (STEP 300). The upper and lower saturation limits are set as 0.01 and 1 respectively. The resulting signal is multiplied by the uncertainty signal S5 (STEP 305) and a rising rate limit applied (STEP 310). In the present embodiment, the rising rate limit is set to 0.7. The resulting signal is output (STEP 315) from the confidence estimator 33 as a dynamic filter coefficient $F_C$. The dynamic filter coefficient $F_C$ sets the first cut-off frequency of the variable frequency low-pass signal filter 35 and the second cut-off frequency of the variable frequency high-pass signal filter 37.

The calculated global pitch angle $\theta_Y$ is filtered by the variable frequency low-pass signal filter 35; and the relative body pitch angle $\theta_{y2}$ is filtered by the variable frequency high-pass signal filter 37. The processor 21 sums the filtered signals to generate the filtered global pitch angle estimate $\theta_{YF}$ for output from the vehicle state estimation apparatus 1. As described herein, the filtered global pitch angle estimate $\theta_{YF}$ can be used by vehicle dynamics controls.

Figure 9A:
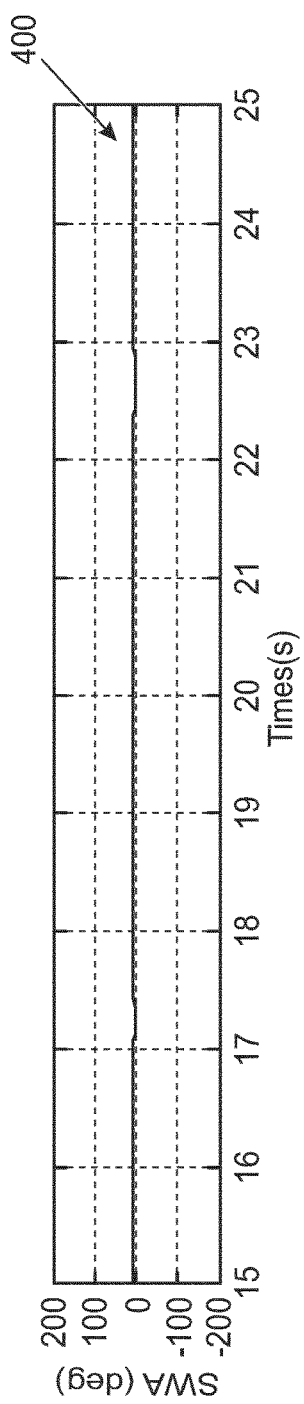
FIGS. 9A, B and C show a first set of measured vehicle parameters with respect to time.
Figure 9B:
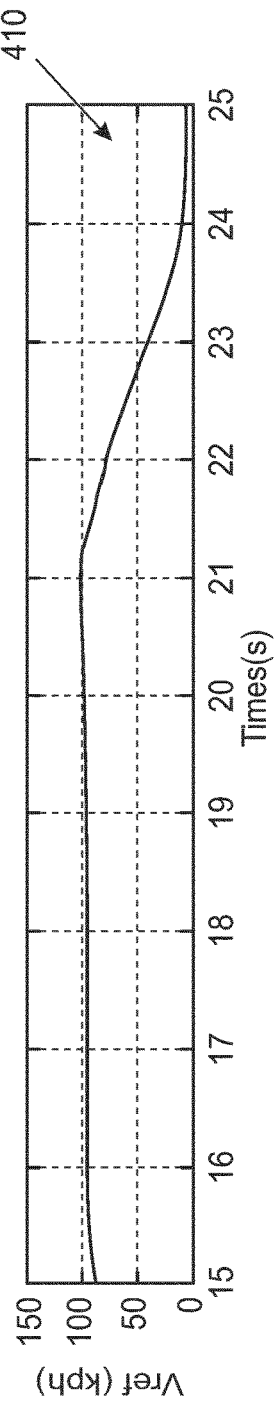
Figure 9C:
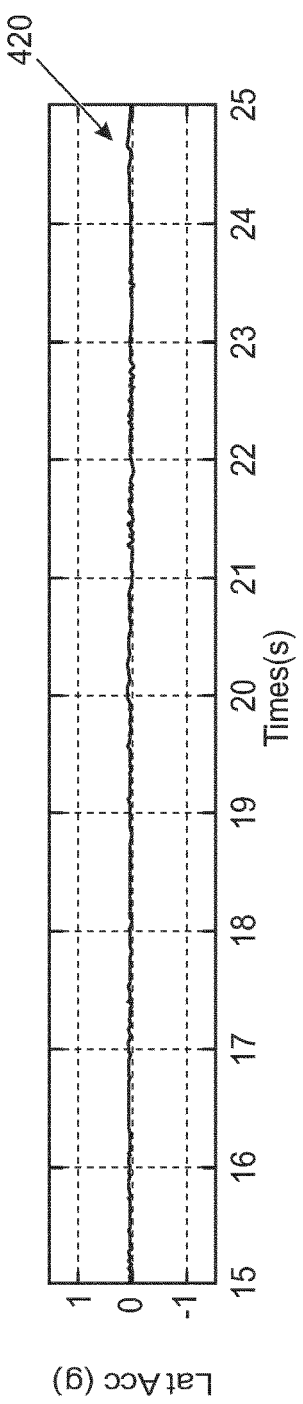

The operation of the vehicle state estimation apparatus 1 to generate the filtered global pitch angle estimate $\theta_{YF}$ will now be described for a first dynamic scenario in which the vehicle 3 undergoes heavy braking from a reference velocity of approximately 100 kph to 5 kph. FIG. 9A shows a first graph 400 showing a measured steering wheel angle (°); FIG. 9B shows a second graph 410 showing a measured reference velocity (U); and FIG. 9C shows a third graph 420 showing a measured lateral acceleration (g). The steering wheel angle, reference velocity and the lateral acceleration are measured concurrently during a first time period. The dynamic filtering of the calculated global pitch angle $\theta_Y$ during the first time period is represented in a fourth graph 430 shown in FIG. 10A; and the determined dynamic filter coefficient $F_C$ during the first time period is represented in a fifth graph 440 shown in FIG. 10B. With reference to FIG. 10A, a first trace T1 shows the calculated global pitch angle $\theta_Y$; a second trace T2 shows the filtered global pitch angle estimate $\theta_{YF}$ generated when the dynamic filter is applied to the calculated global pitch angle $\theta_Y$; a third trace T3 shows a filtered global pitch angle $\theta_Y$ generated by applying a discrete filter to the calculated global pitch angle $\theta_Y$; and a fourth trace T4 shows a measured global pitch angle $\theta_Y$ for comparison purposes. The calculated global pitch angle $\theta_Y$ creates an erroneous signal in periods of wheel slip during the braking event. However, by dynamically controlling the filter coefficient $F_C$, the filtered global pitch angle estimate $\theta_{YF}$ more closely follows the measured global pitch angle $\theta_Y$. This is evident from FIG. 10A in which the second trace T2 more closely follows the fourth trace T4 than either the first trace T1 or the third trace T3.

Figure 11A:
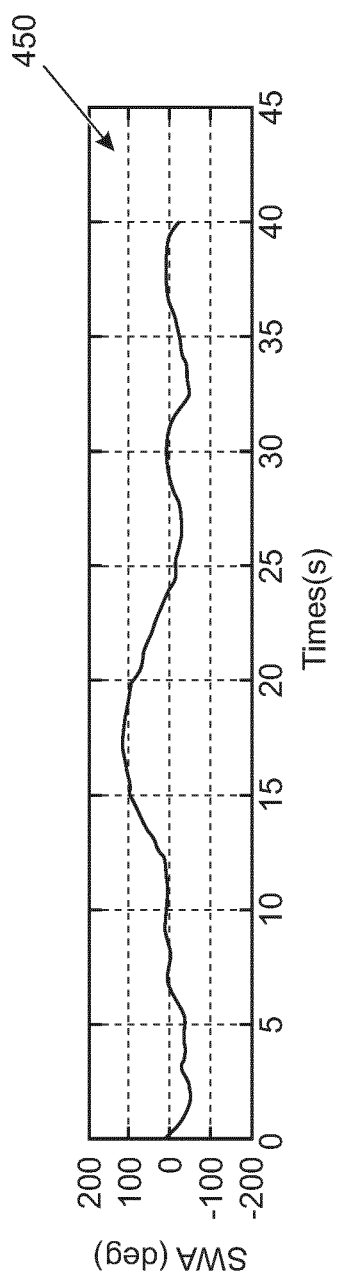
FIGS. 11A, B and C show a second set of measured vehicle parameters with respect to time.
Figure 11B:
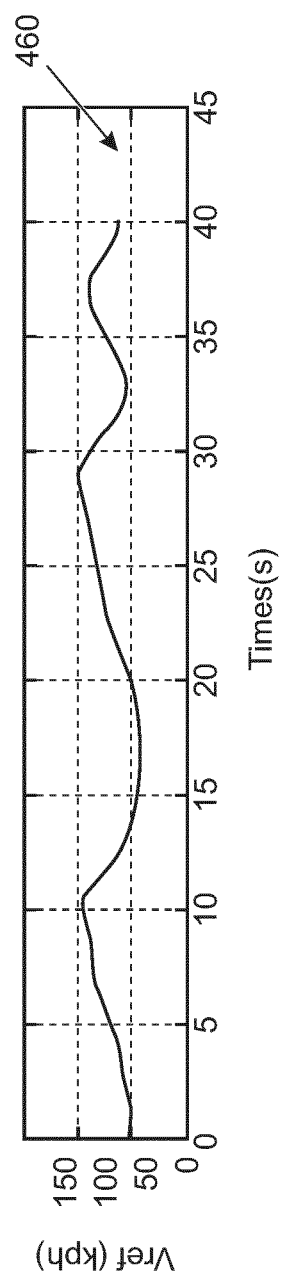
Figure 11C:
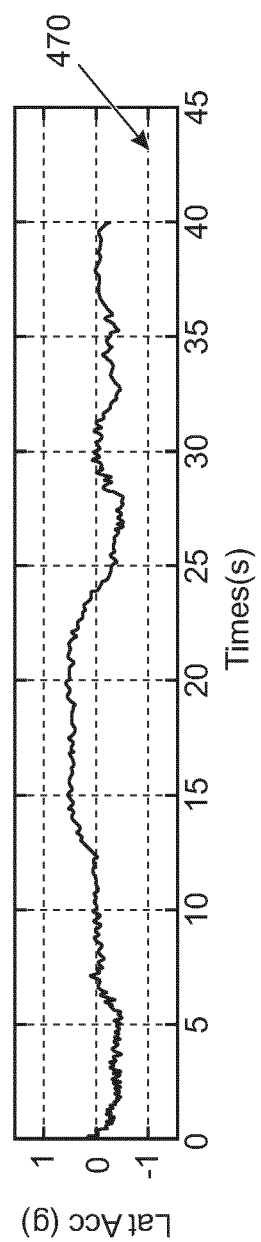

The operation of the vehicle state estimation apparatus 1 to generate the filtered global pitch angle estimate $\theta_{YF}$ will now be described for a second dynamic scenario in which the vehicle 3 experiences excess roll as it travels around a hairpin corner. FIG. 11A shows a sixth graph 450 showing a measured steering wheel angle (°); FIG. 11B shows a seventh graph 460 showing a measured reference velocity (U); and FIG. 11C shows an eighth graph 470 showing a measured lateral acceleration (g). The steering wheel angle, reference velocity and the lateral acceleration are measured concurrently during a second time period. The dynamic filtering of the calculated global pitch angle $\theta_Y$ during the second time period is illustrated in a ninth graph 480 shown in FIG. 12A; and the determined dynamic filter coefficient $F_C$ during the first time period is shown in a tenth graph 490 FIG. 12B. With reference to FIG. 11A, a first trace T1 shows the calculated global pitch angle $\theta_Y$; a second trace T2 shows the filtered global pitch angle estimate $\theta_{YF}$ generated when the dynamic filter is applied to the calculated global pitch angle $\theta_Y$; a third trace T3 shows a filtered global pitch angle $\theta_Y$ generated by applying a discrete filter to the calculated global pitch angle $\theta_Y$; and a fourth trace T4 shows a measured global pitch angle $\theta_Y$ for comparison purposes. The calculated global pitch angle $\theta_Y$ creates an erroneous signal in periods of wheel slip during the braking event. However, by dynamically controlling the filter coefficient $F_C$, the filtered global pitch angle estimate $\theta_{YF}$ more closely follows the measured global pitch angle $\theta_Y$. This is evident from FIG. 11A in which the second trace T2 more closely follows the fourth trace T4 than either the first trace T1 or the third trace T3. The filter coefficient $F_C$ during the second time period is shown in a fifth trace T5 in tenth graph 490 shown in FIG. 12B.

It will be appreciated that various changes and modifications can be made to the vehicle state estimation apparatus 1 described herein. The vehicle state estimation apparatus 1 could be configured to estimate body roll angle $\theta_X$. For example, the vehicle state estimation apparatus 1 could use dynamic vehicle parameters such as lateral velocity and/or lateral acceleration; and/or control inputs such as steering angle $\theta$.

The vehicle state estimation apparatus 1 has been described with reference to determining the filtered global pitch angle estimate $\theta_{YF}$. However, it has been recognised that the techniques are also applicable to determine the reference velocity V of the vehicle 2. Notably, the confidence estimator 33 can provide an indication of the confidence in the reference velocity V. The dynamic filter coefficient $F_C$ generated by the confidence estimator 33 can be used to set a cut-off frequency of a variable frequency low-pass signal filter 35 and/or a variable frequency high-pass signal filter 37. The reference velocity V can be determined in dependence on the resulting filtered signal(s). The reference velocity V is output to vehicle dynamic controllers and used to control dynamic operation of the vehicle 2. By determining confidence in the calculated reference velocity V and/or improving the accuracy of the reference velocity V, more robust vehicle control can be achieved. The application of the global pitch angle estimate techniques to determine the reference velocity V of the vehicle 2 will now be described with reference to FIGS. 13 to 18.

Figure 13:
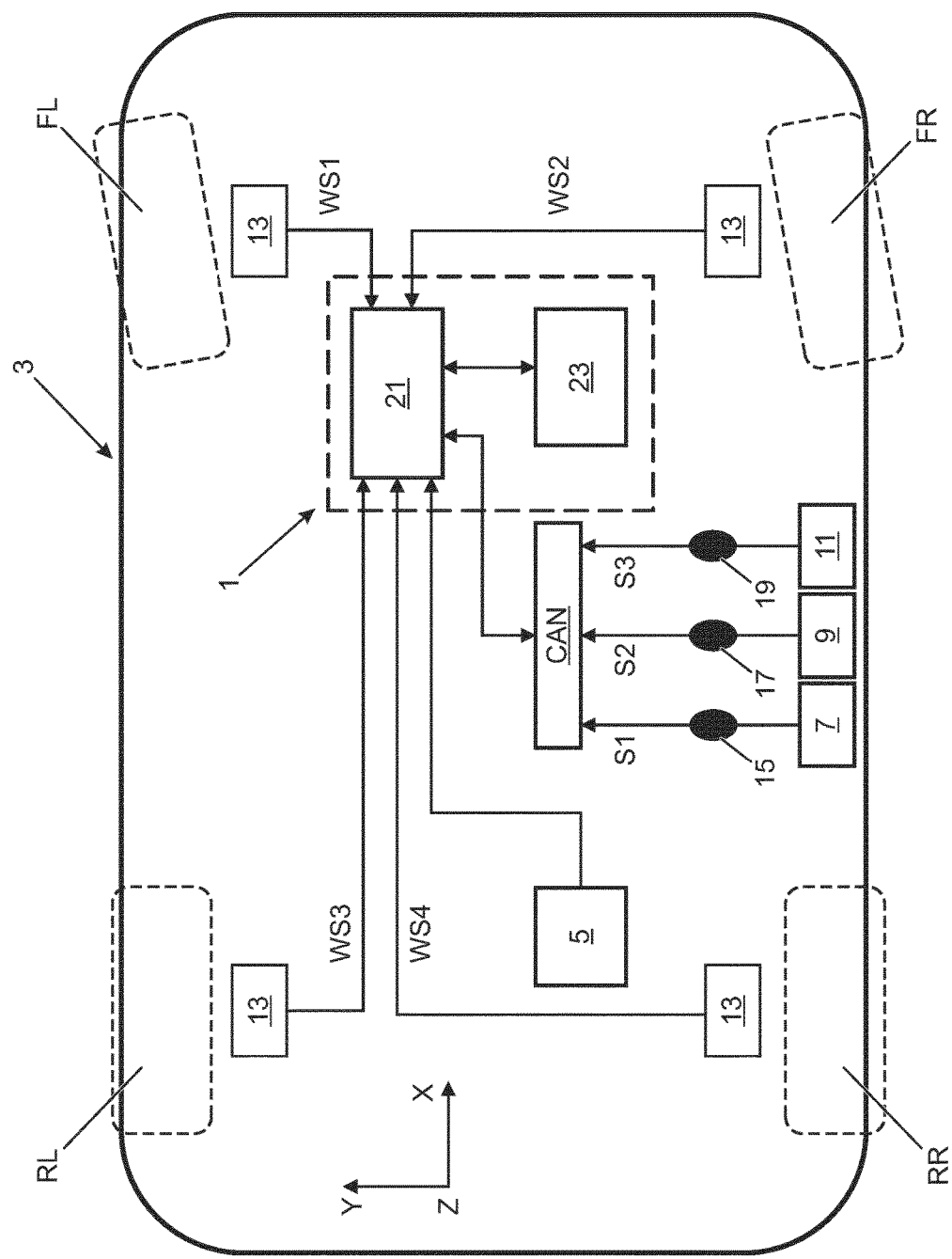
FIG. 13 shows a schematic overview of a vehicle incorporating a vehicle reference velocity estimation apparatus in accordance with a further embodiment of the present invention.

As shown in FIG. 13, the vehicle 3 is an automotive vehicle having four wheels FL, FR, RL, RR, an inertial measurement unit (IMU) 5, a throttle pedal 7, a brake pedal 9 and a steering wheel 11. The IMU 5 comprises a first accelerometer adapted to measure the longitudinal acceleration $A_X$ of the vehicle 3 (i.e. acceleration along the longitudinal axis X); and a second accelerometer adapted to measure angular acceleration $\omega_Z$ about the vertical axis Z. A rotational speed sensor 13 is provided to measure the rotational speed of each wheel FL, FR, RL, RR to generate wheel speed signals WS1-4. A first position sensor 15 is provided to measure the position of the throttle pedal 7 and to output a throttle pedal position signal S1. A pressure sensor 17 is provided to measure the hydraulic pressure in the brake system and to output a brake pressure signal S2. A steering wheel angle sensor 19 is provided to measure the steering angle $\theta$ of the steering wheel 11 and to output a steering angle signal S3.

Figure 14:
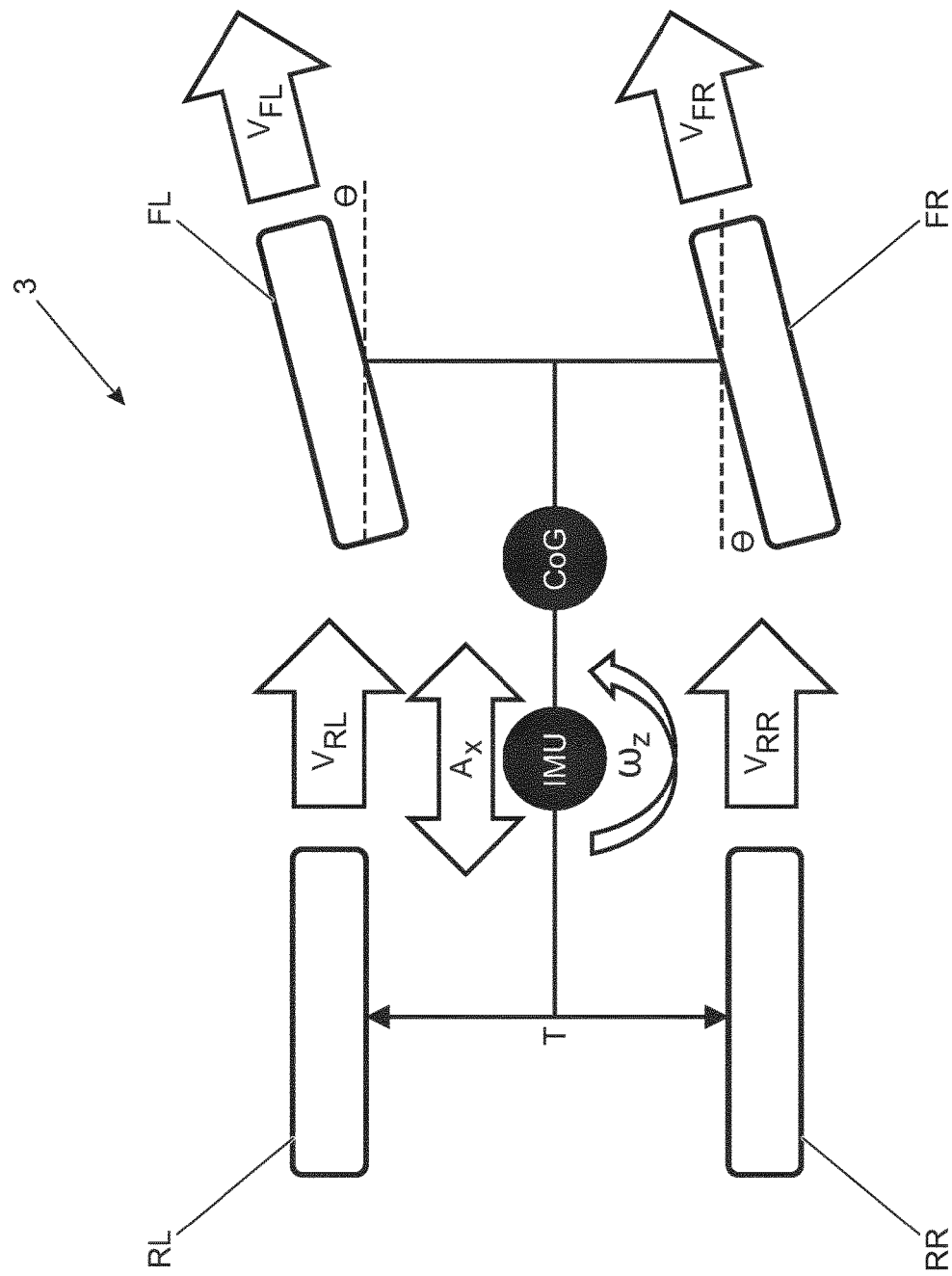
FIG. 14 shows a schematic representing of the reference velocity for the vehicle shown in FIG. 13.

The rotational speed sensor 13 for each wheel FL, FR, RL, RR in the present embodiment is in the form of a magnetic (Hall effect) sensor operative in combination with a coded toothed toning disc in the associated wheel hub. The wheel speed is translated to a single datum point of the vehicle, for example to an assumed centre of gravity (CoG) of the vehicle 3. With reference to FIG. 14, the longitudinal wheel speed V of each wheel FL, FR, RL, RR, translated to the COG, is calculated using the following equations:

$$V_{FL,CoG} = \frac{V_{FL}}{\cos\theta} + 1/2T\omega_z$$

$$V_{FR,CoG} = \frac{V_{FR}}{\cos\theta} - 1/2T\omega_z$$

-continued $$V_{RL,CoG} = V_{RL} + 1/2T\omega_z$$

$$V_{RR,CoG} = V_{RR} - 1/2T\omega_z$$

Where: $V_{CoG}$ is the wheel speed translated to the CoG;
V is the measured speed of each wheel (FL, FR, RL, RR);
θ is the steering angle;
$\omega_z$ is the angular acceleration about the vertical axis Z; and
T is the wheel track.

Figure 15:
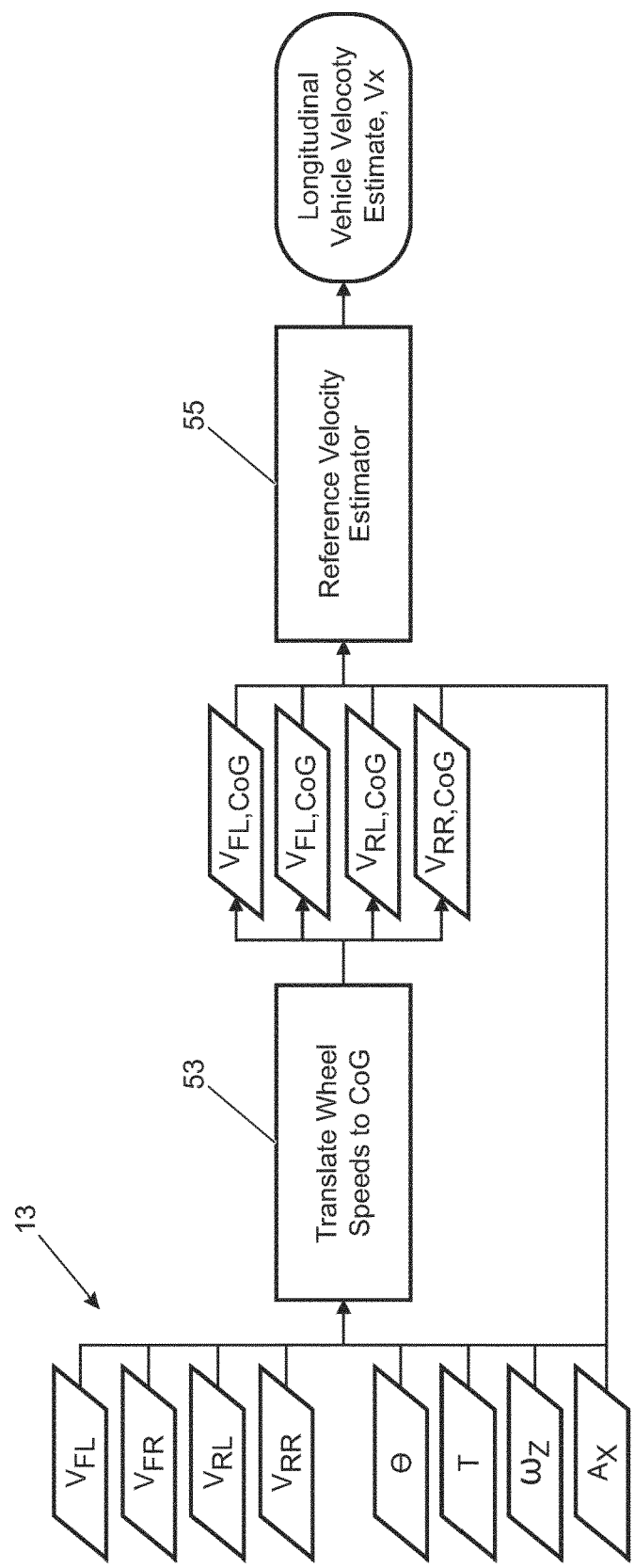
FIG. 15 shows a flow diagram representing determination of the longitudinal vehicle velocity estimate.

As shown in FIG. 15, the measured wheel speeds $V_{FL}$, $V_{FR}$, $V_{RL}$, $V_{RR}$, the steering angle θ, the wheel track T, the angular acceleration $\omega_z$ and the longitudinal acceleration $A_X$ are output to a wheel speed translator 53 configured to calculate the translated longitudinal wheel speed $V_{CoG}$ of each wheel FL, FR, RL, RR. The translated longitudinal wheel speeds $V_{CoG}$ are output to the reference velocity estimator 55 which outputs the longitudinal reference velocity V for the vehicle 3.

The reference velocity V of the vehicle 3 can be determined by averaging the measured speed of each wheel FL, FR, RL, RR. The reference velocity estimator 55 can optionally perform one or more of the following functions:
  (a) Remove effects of steering angle θ and/or yaw angle using measured vehicle parameters from the steering wheel 11 and/or dynamic parameters measured by the on board IMU 5.
  (b) In a two-wheel drive application, the forward velocity can be determined based on the measured speed of the non-driven wheels (since these are less likely to be in positive slip from positive engine torque).
  (c) In high lateral acceleration manoeuvres, the forward velocity can be determined based on the average of the rotational speeds of the outside wheels (since these are less likely to lose traction with the road surface, for example due to lifting).
  (d) Using longitudinal acceleration $A_X$ from the IMU 5 to perform plausibility checks on wheel speed information, for example if the vehicle 3 is not decelerating but wheels speeds are very low this can imply a wheel lock scenario (and one or more measured wheel speeds can be ignored).
  (e) Integration of longitudinal acceleration for short periods of time when all wheel speeds are determined unstable.

Figure 16:
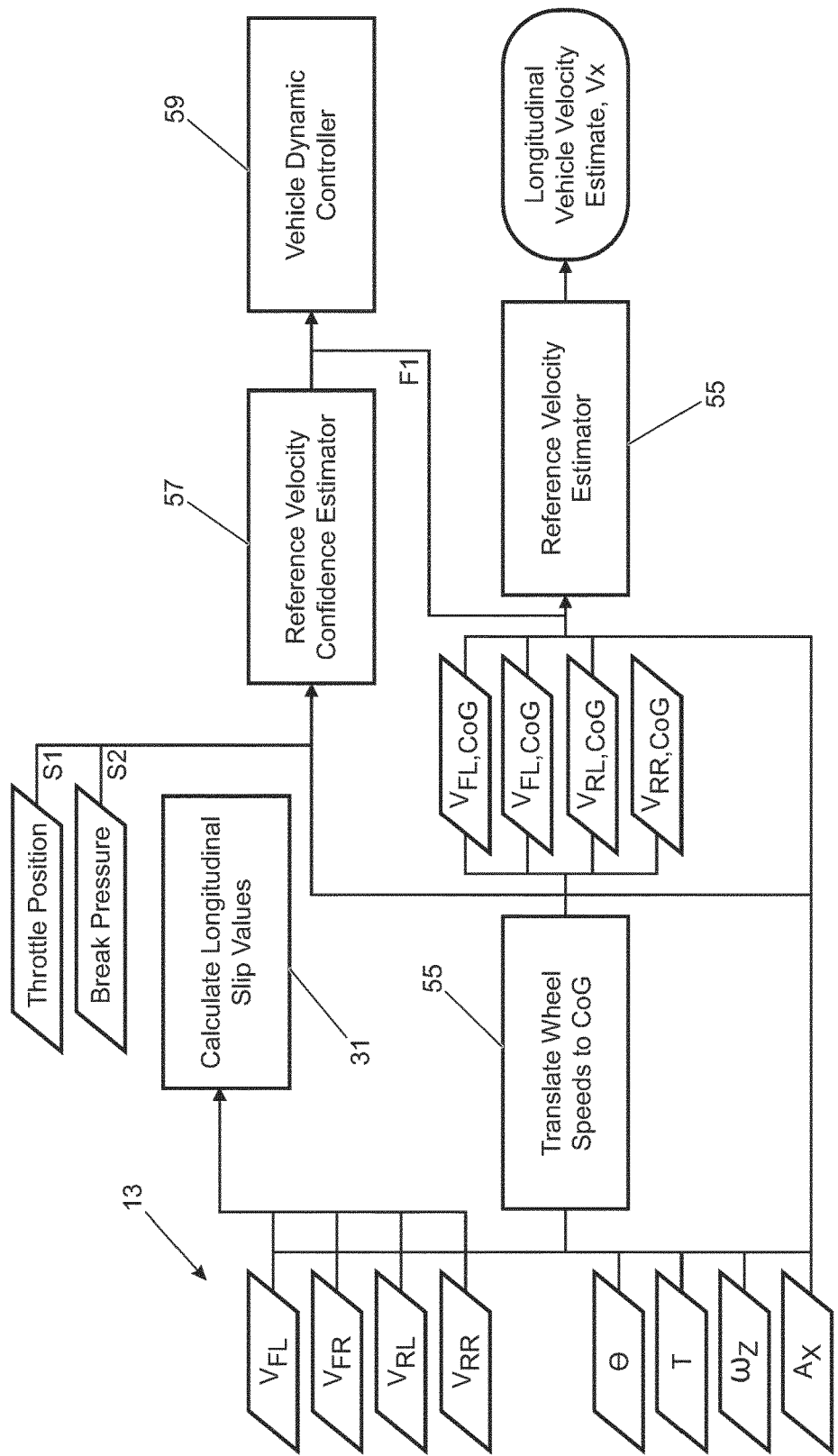
FIG. 16 shows a flow diagram representing determination of the reference velocity confidence estimator and output to a vehicle dynamic controller.

A slip calculator 31 is provided for calculating wheel slip values SL1-4, as shown in FIG. 16. The slip calculator 31 uses the measured wheel speeds $V_{FL}$, $V_{FR}$, $V_{RL}$, $V_{RR}$ from the speed sensors 13 to calculate the wheel slip values, as described herein with reference to the vehicle state estimation apparatus 1. A reference velocity confidence estimator 157 is provided to calculate one or more confidence values F1 in dependence on at least one vehicle dynamic parameter and/or at least one control input. The calculated confidence value F1 provides an indication of the confidence in the calculated reference velocity V. In the present embodiment the confidence value F1 ranges from 0 to 1 (inclusive), where 0 represents low confidence and 1 represents high confidence. The reference velocity confidence estimator 157 receives at least one vehicle dynamic parameter such as the wheel slip values SL1-4 determined by the slip calculator 31 and/or longitudinal acceleration measured by the IMU 5; and at least one control input, such as the throttle pedal signal S1 and/or the brake pressure signal S2. The reference velocity confidence estimator 157 can optionally also receive the measured wheel speeds $V_{FL}$, $V_{FR}$, $V_{RL}$, $V_{RR}$, the steering angle θ, the wheel track T, the angular acceleration $\omega_z$ and the longitudinal acceleration $A_X$ from the corresponding sensors. The confidence value F1 is output to the reference velocity estimator 55 and/or to a dynamic controller 59. The reference velocity estimator 55 determines the vehicle reference velocity V in dependence on the confidence value F1, for example by applying a dynamic filter.

Figure 17:
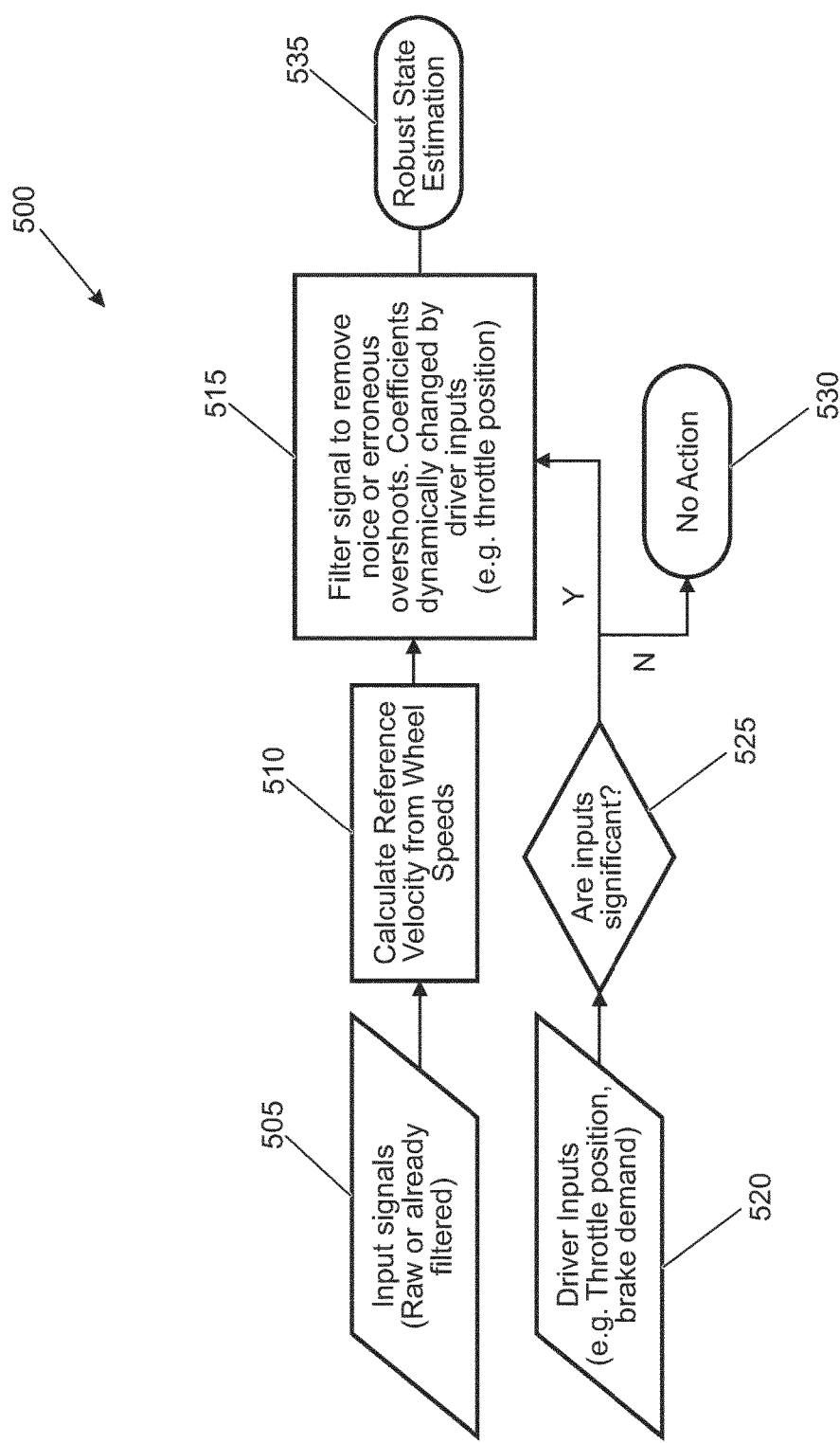
FIG. 17 shows a flow diagram representing dynamic filtering of the reference velocity in dependence on control inputs.

An overview of the operation of the reference velocity confidence estimator 57 is provided in a flow diagram 500 shown in FIG. 17. The reference velocity confidence estimator 57 receives the wheel speeds $V_{FL}$, $V_{FR}$, $V_{RL}$, $V_{RR}$, (STEP 505), which can be filtered or unfiltered (raw) data. A first estimation of the reference velocity V is calculated (STEP 510) using the wheel speeds $V_{FL}$, $V_{FR}$, $V_{RL}$, $V_{RR}$. A variable frequency filter is applied to the calculated reference velocity V (STEP 515) to remove noise or erroneous overshoots. An operating frequency of the variable frequency filter is determined in dependence on the calculated confidence value F1 (or a selected one of a plurality of said calculated confidence values F1). Specifically, the calculated confidence value F1 is used to determine a filter coefficient $F_C$ to control an operating frequency of the variable frequency filter. In the present embodiment, the confidence value F1 is calculated in dependence on a control input in the form of the throttle pedal position signal S1 and/or the brake pressure signal S2 (STEP 520). The reference velocity confidence estimator 57 receives the at least one control input (STEP 525) and performs a check to determine if the control inputs are significant (STEP 530). For example, the reference velocity confidence estimator 57 can determine if the throttle pedal position signal S1 and the brake pressure signal S2 exceed respective thresholds. If the control inputs are determined not to be significant, no action is required (STEP 535). If, however, the control inputs are determined to be significant, the confidence value F1 is modified dynamically. The determined confidence value F1 sets the operating frequency of the variable frequency filter which is then used to filter the calculated reference velocity V (STEP 540). A filtered reference velocity $V_F$ is output (STEP 535), for example to a vehicle dynamics controller to control dynamic operation of the vehicle 3.

In a similar manner to the dynamic filtering of global and relative pitch described herein, the determined confidence value F1 can be used to calculate a filtered reference velocity $V_F$ from multiple reference velocity sources. By generating the filtered reference velocity from several different sources, a more accurate estimate of the reference velocity V can be obtained. A first reference velocity $V_1$ can be derived from the measured speed of the wheels FL, FR, RL, RR; and a second reference velocity $V_2$ can be derived from a second source, such as integration of longitudinal acceleration $A_X$ from the IMU 5, the speed obtained from GPS information, or another source. The first and second reference velocities $V_1$, $V_2$ can be dynamically filtered in dependence on the determined confidence value F1 and then combined to generate the filtered reference velocity $V_F$. The two filtered signals can complement each other to cover the whole desired frequency range. Indeed, at least in certain embodiments, there may be a third or additional source(s) of reference velocity V and a three way or more combination of signals made. The calculation of a filtered reference velocity $V_F$ from multiple sources will now be described.

Figure 18:
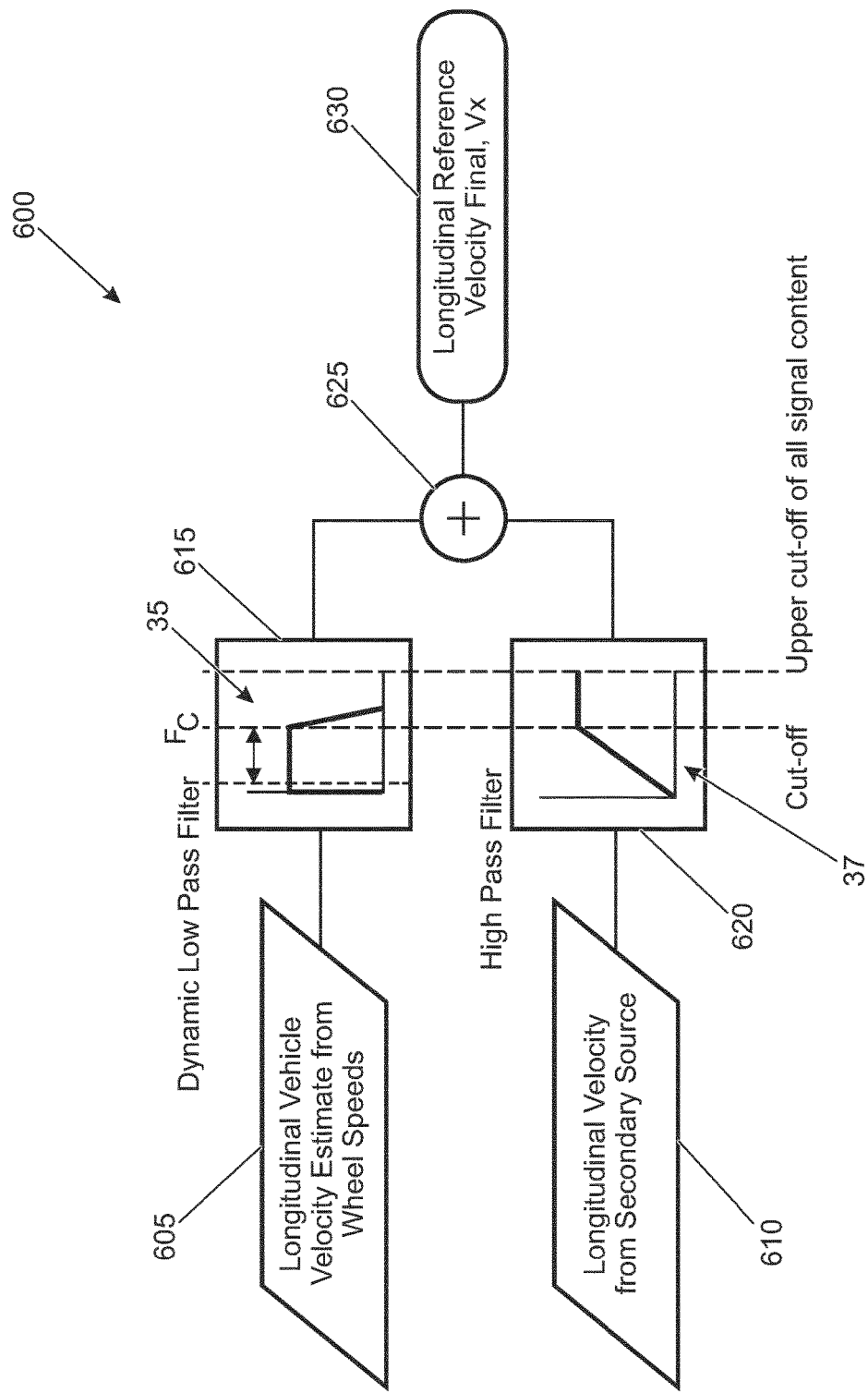
FIG. 18 shows a flow diagram representing dynamic high-pass and low-pass filtering of the vehicle reference velocity.

The determination of the filtered reference velocity $V_F$ from first and second reference velocities $V_1$, $V_2$ will now be described with reference to in a flow diagram 600 shown in FIG. 18. The first reference velocity $V_1$ is obtained from a first source which in the present embodiment is the reference velocity calculator 25 which receives the wheel speed signals WS1-4 from the rotational speed sensors 13 associated with each wheel FL, FR, RL, RR.

The first reference velocity $V_1$ is calculated using the wheel speed signals WS1-4 to determine the mean rotational speed WS of the wheels FL, FR, RL, RR (STEP 605). The second reference velocity $V_2$ is obtained from a second source which in the present embodiment is the longitudinal acceleration $A_X$ measured by the IMU 5 (STEP 610). Alternatively, or in addition, the second source could comprise global positioning system (GPS) operative to measure the second reference velocity $V_2$.

The first reference velocity $V_1$ is output to the variable frequency low-pass filter 35; and the second reference velocity $V_2$ is output to the variable frequency high-pass filter 37. A cut-off frequency of the variable frequency low-pass signal filter 35 can be set at between zero (0) and one (1) Hertz inclusive. Similarly, the cut-off frequency of the variable frequency high-pass signal filter 37 can be set between zero (0) and one (1) Hertz inclusive. As described herein, the reference velocity confidence estimator 57 calculates the confidence value F1 in dependence on at least one vehicle dynamic parameter and/or at least one control input. In the present embodiment, the confidence value F lies in the range zero (0) to one (1), with zero (0) representing the maximum confidence and one (1) representing the minimum confidence. The confidence value F is used to determine a filter coefficient $F_C$ to set the cut-off frequency of the variable frequency low-pass signal filter 35 and the cut-off frequency of the variable frequency high-pass signal filter 37. The cut-off frequency of the variable frequency low-pass signal filter 35 and the variable frequency high-pass signal filter 37 are set at the same value in dependence on the determined filter coefficient $F_C$. As illustrated in FIG. 18, the first reference velocity $V_1$ is filtered by the variable frequency low-pass filter 35 (STEP 615); and the second reference velocity $V_2$ is filtered by the variable frequency high-pass filter 37 (STEP 620). The filtered first and second signals are then summed (STEP 625) to generate the filtered global reference velocity $V_F$. The filtered global reference velocity $V_F$ is then output (STEP 630).

Figure 19:
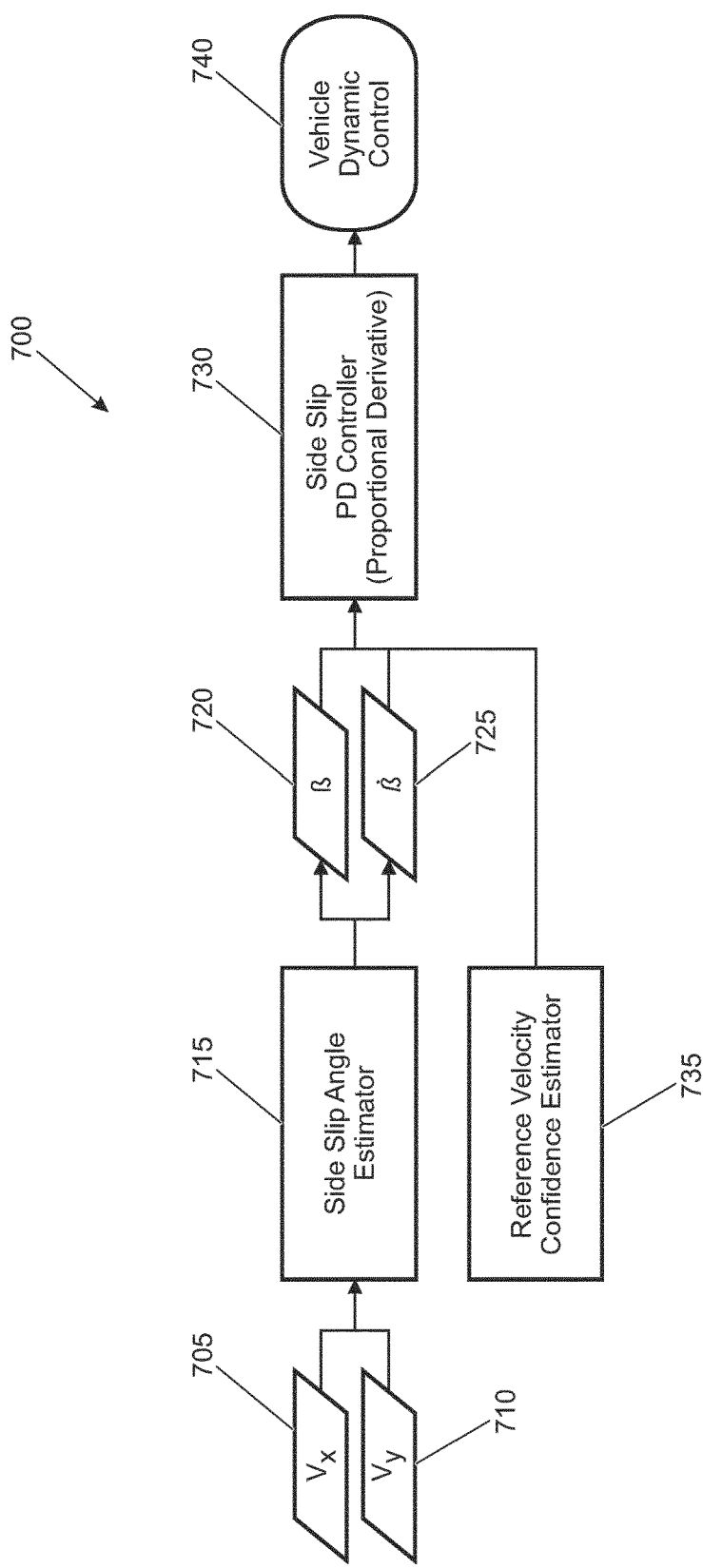
FIG. 19 shows a flow diagram representing operation of a side slip proportional derivative controller in dependence on a determined reference velocity confidence.

Alternatively, or in addition, the reference velocity confidence estimator 57 can be output to a vehicle dynamic controller 61. The use of the reference velocity confidence estimator 57 to control the vehicle dynamic controller 61 is illustrated in a flow diagram 700 shown in FIG. 19. A reference longitudinal velocity $V_x$ (STEP 705) and a reference transverse velocity V (STEP 710) are input to a side slip estimator 163 which estimates a side slip angle β at the rear axle using the equation $β=V_y/V_x$ (STEP 715). A side slip angle β (STEP 720) and a side slip rate $\dot{β}$ (STEP 725) are output to a proportional derivative (PD) side slip controller 163 (STEP 730). The reference velocity confidence estimator 157 determines the confidence value F1 for the calculated longitudinal reference velocity $V_x$ and/or the calculated transverse reference velocity $V_Y$ and this is also output to the PD side slip controller 163 (STEP 735). The PD side slip controller 163 outputs a control signal to the vehicle dynamic controller 61 (STEP 740). The operation of the vehicle dynamic controller 61 is controlled in dependence on the control signal. By way of example, if the confidence value F1 output to the PD side slip controller 163 is low, this can provide an indication that the calculated side slip angle β is smaller than or larger than was intended. The PD side slip controller 163 is configured to output a control signal to the vehicle dynamic control to deliver brake pressures to the wheels to generate a yaw torque. The PD side slip controller 61 can be tuned to achieve desired levels of vehicle slip angle or rate magnitude. In the event that the reference velocity confidence estimator 157 determining a low confidence in the calculated reference velocity V, the PD side slip controller 163 could be configured to turn off the PD side slip controller 163, as response cannot be relied upon. Alternatively, or in addition, the PD side slip controller 163 can be configured to change the vehicle dynamic controller 61 to an alternate set of tuneable parameters, for example switch to a "sensitised" control setting having tighter dead bands and/or gains in order to capture side slip events at lower input levels. At least in certain embodiments, this approach would be appropriate since the calculated reference velocity V might be greater than the real value.

It will be appreciated that various changes and modifications can be made to the apparatus and methods described herein without departing from the scope of the present application.

The invention claimed is:

1. An apparatus for estimating confidence in a vehicle reference velocity, the apparatus comprising:
   a controller comprising an electronic processor having an electrical input for receiving at least one vehicle operating parameter;
   an electronic memory device electrically coupled to the electronic processor and having instructions stored therein;
   wherein the electronic processor is configured to access the memory device and execute the instructions stored therein such that it is operable to:
   monitor the at least one vehicle operating parameter;
   determine a rate of change of the at least one vehicle operating parameter; and
   calculate a confidence value representing the confidence in the vehicle reference velocity, the confidence value being calculated in dependence on the determined rate of change of the at least one vehicle operating parameter; and
   output the confidence value to a vehicle dynamics controller.

2. The apparatus as claimed in claim 1, wherein the controller is configured to set an operating frequency of a signal filter in dependence on the confidence value.

3. The apparatus as claimed in claim 2, wherein the controller is configured to apply the signal filter to at least a first vehicle reference velocity.

4. The apparatus as claimed in claim 3, wherein the first vehicle reference velocity is determined in dependence on a measured wheel speed of at least one wheel of the vehicle.

5. The apparatus as claimed in claim 3, wherein the controller is configured to apply the signal filter to a second vehicle reference velocity.

6. The apparatus as claimed in claim 1, wherein the controller is configured to:
   apply a filter to the determined rate of change, and
   wherein the calculated confidence value is calculated in dependence on the filtered rate of change.

7. The apparatus as claimed in claim 5, wherein the at least one vehicle operating parameter comprises a vehicle dynamics parameter.

8. The apparatus as claimed in claim 7, wherein the vehicle dynamics parameter is longitudinal vehicle acceleration.

9. The apparatus as claimed in claim 5, wherein the at least one vehicle operating parameter comprises a vehicle control input.

10. The apparatus as claimed in claim 9, wherein the vehicle control input is a throttle pedal position or a brake pedal position.

11. The apparatus as claimed in claim 1, wherein the at least one vehicle operating parameter comprises a wheel slip measurement of at least one wheel of the vehicle.

12. The apparatus as claimed in claim 11, wherein the wheel slip measurement is compared to a look-up table to calculate the confidence value.

13. The apparatus as claimed in claim 1, wherein the controller is configured to calculate a plurality of the confidence values, each confidence value being calculated in dependence on a different vehicle operating parameter; and
wherein the controller is configured to select one of the plurality of confidence values representing a lowest confidence in the vehicle reference velocity.

14. A vehicle comprising the apparatus as claimed in claim 1.

15. A method of determining confidence in a vehicle reference velocity, the method comprising:
receiving at least one vehicle operating parameter;
monitoring the at least one vehicle operating parameter;
determining a rate of change of the at least one vehicle operating parameter;
calculating a confidence value representing the confidence in the vehicle reference velocity, the confidence value being calculated in dependence on the determined rate of change of the at least one vehicle operating parameter; and
outputting the confidence value to a vehicle dynamics controller.

16. A non-transitory, computer-readable storage medium storing instructions thereon that when executed by one or more electronic processors causes the one or more electronic processors to carry out the method of claim 15.

* * * * *